United States Patent
Matzner et al.

(10) Patent No.: US 12,496,770 B2
(45) Date of Patent: Dec. 16, 2025

(54) DIGITALLY-CONTROLLED THREE-DIMENSIONAL PRINTING OF POLYMERIZABLE MATERIALS

(71) Applicant: Stratasys Ltd., Rehovot (IL)

(72) Inventors: Eynat Matzner, Adi (IL); Ira Yudovin-Farber, Rehovot (IL); Shai Hirsch, Rehovot (IL); Lev Kuno, Tzur-Hadassah (IL)

(73) Assignee: Stratasys Ltd., Rehovot (IL)

( * ) Notice: Subject to any disclaimer, the term of this patent is extended or adjusted under 35 U.S.C. 154(b) by 180 days.

(21) Appl. No.: 17/878,123

(22) Filed: Aug. 1, 2022

(65) Prior Publication Data

US 2022/0379548 A1 Dec. 1, 2022

Related U.S. Application Data

(63) Continuation of application No. 15/549,191, filed as application No. PCT/IL2016/050135 on Feb. 5, 2016, now abandoned.

(Continued)

(51) Int. Cl.
| | |
|---|---|
| *B29C 64/112* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(Continued)

(52) U.S. Cl.
CPC .......... *B29C 64/112* (2017.08); *B29C 64/393* (2017.08); *B33Y 10/00* (2014.12); *B33Y 30/00* (2014.12); *B33Y 50/02* (2014.12); *B33Y 70/00* (2014.12); *B41J 2/01* (2013.01); *C09D 11/101* (2013.01); *C09D 11/30* (2013.01)

(58) Field of Classification Search
CPC ..... B29C 64/112; B29C 64/393; B33Y 10/00; B33Y 30/00; B33Y 50/02; B33Y 70/00; B41J 2/01; C09D 11/101; C09D 11/30
See application file for complete search history.

(56) References Cited

U.S. PATENT DOCUMENTS

| | | | |
|---|---|---|---|
| 5,491,200 A | 2/1996 | Harris et al. | |
| 6,259,962 B1 | 7/2001 | Gothait | |

(Continued)

FOREIGN PATENT DOCUMENTS

| | | |
|---|---|---|
| EP | 1498256 | 1/2005 |
| EP | 2801588 | 11/2014 |

(Continued)

OTHER PUBLICATIONS

Invitation Pursuant to Rule 137(4) EPC and Article 94(3) EPC Dated Mar. 19, 2024 From the European Patent Office Re. Application No. 19206004.4 (4 Pages).
Invitation Pursuant to Rule 137(4) EPC and Article 94(3) EPC Dated Jul. 4, 2023 From the European Patent Office Re. Application No. 19206004.4 (4 Pages).
European Search Report and the European Search Opinion Dated Jan. 30, 2020 From the European Patent Office Re. Application No. 19206004.4. (7 Pages).

(Continued)

*Primary Examiner* — S. Behrooz Ghorishi

(57) ABSTRACT

Provided are methods of fabricating an object, effected by jetting two or more different compositions, each containing a different material or mixture of materials, which, when contacted on a receiving medium, undergo a chemical reaction therebetween to form the building material. The chemical composition of the formed building material is dictated by a ratio of the number of voxels of each composition in a voxel block. Systems for executing the methods, and printed objects obtained thereby are also provided.

13 Claims, 4 Drawing Sheets

Related U.S. Application Data

(60) Provisional application No. 62/112,277, filed on Feb. 5, 2015.

(51) Int. Cl.
    *B33Y 70/00*     (2020.01)
    *B41J 2/01*      (2006.01)
    *C09D 11/101*    (2014.01)
    *C09D 11/30*     (2014.01)

(56) References Cited

U.S. PATENT DOCUMENTS

| | | | |
|---|---|---|---|
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 9,139,752 | B2 | 9/2015 | Desbois et al. |
| 2002/0111707 | A1 | 8/2002 | Li et al. |
| 2012/0283406 | A1 | 11/2012 | Klitschke et al. |
| 2013/0065466 | A1 | 3/2013 | Desbois et al. |
| 2013/0073068 | A1 | 3/2013 | Napadensky |
| 2013/0128452 | A1 | 5/2013 | Baquiano et al. |
| 2017/0341296 | A1 | 11/2017 | Fenn et al. |
| 2018/0029291 | A1 | 2/2018 | Matzner et al. |

FOREIGN PATENT DOCUMENTS

| | | |
|---|---|---|
| EP | 3626788 | 3/2020 |
| GB | 2382798 | 6/2003 |
| WO | WO 2013/128452 | 9/2013 |
| WO | WO 2016/125170 | 8/2016 |

OTHER PUBLICATIONS

Final Official Action Dated Sep. 9, 2021 from the US Patent and Trademark Office Re. U.S. Appl. No. 15/549,191. (17 pages).
Final Official Action Dated Jun. 9, 2020 from the US Patent and Trademark Office Re. U.S. Appl. No. 15/549,191. (29 pages).
International Preliminary Report on Patentability Dated Aug. 17, 2017 From the International Bureau of WIPO Re. Application No. PCT/IL2016/050135. (7 Pages).
International Search Report and the Written Opinion Dated May 8, 2016 From the International Searching Authority Re. Application No. PCT/IL2016/050135.
Interview Summary Dated Feb. 14, 2022 from US Patent and Trademark Office Re. U.S. Appl. No. 15/549,191. (3 pages).
Office Action Dated Dec. 15, 2019 From the Israel Patent Office Re. Application No. 253826 and Its Translation Into English. (5 Pages).
Official Action Dated Mar. 2, 2021 From the US Patent and Trademark Office Re. U.S. Appl. No. 15/549,191. (14 Pages).
Official Action Dated May 26, 2022 from US Patent and Trademark Office Re. U.S. Appl. No. 15/549,191. (12 pages).
Official Action Dated Sep. 30, 2019 From the US Patent and Trademark Office Re. U.S. Appl. No. 15/549,191. (46 pages).
Restriction Official Action Dated Jun. 11, 2019 From the US Patent and Trademark Office Re. U.S. Appl. No. 15/549,191. (10 Pages).
Supplementary European Search Report and the European Search Opinion Dated Sep. 20, 2018 From the European Patent Office Re. Application No. 16746248.0. (8 Pages).
Doubrovski et al. "Voxel-Based Fabrication Through Material Property Mapping: A Design Method for Bitmap Printing", Computer-Aided Design, XP029107146, 60(C): 3-13, Available Online Jun. 5, 2014. Abstract, p. 7, Para 3.2.3, p. 11-12, Para 5.2, Section 3 'Voxed-Based Design for 3D Printing', Section 4 'Implementation'.
Khodabakhshi "Anionic Polymarisation of Caprolactam: an Approach to Optimising the Polymerisation Condition to Be Used in the Jetting Process", Polymer Technology and Materials Engineering, Loughborough University, Department of Materials, 2011. Thesis.

DIGITALLY-CONTROLLED THREE-DIMENSIONAL PRINTING OF POLYMERIZABLE MATERIALS

RELATED APPLICATIONS

This application is a continuation of U.S. patent application Ser. No. 15/549,191 filed on Aug. 7, 2017, which is a National Phase of PCT Patent Application No. PCT/IL2016/050135 having International Filing Date of Feb. 5, 2016, which claims the benefit of priority under 35 USC § 119(e) of U.S. Provisional Patent Application No. 62/112,277 filed on Feb. 5, 2015. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to methods of performing three-dimensional inkjet printing, to compositions utilized in these methods and to objects obtained by these methods.

Three-dimensional (3D) inkjet printing is a known process for building three dimensional objects by selectively jetting chemical compositions, for example, polymerizable compositions, via ink-jet printing head nozzles, onto a printing tray in consecutive layers, according to pre-determined image data. 3D inkjet printing is performed by a layer by layer inkjet deposition of chemical compositions. Thus, a chemical composition is dispensed in droplets from a dispensing head having a set of nozzles to form layers on a receiving medium. The layers may then be cured or solidified using a suitable methodology, to form solidified or partially solidified layers of the building material.

The chemical compositions used for forming the building material may be initially liquid (e.g., when jetted through the inkjet printing head nozzles), and subsequently hardened (cured or solidified) to form the required layer shape. The hardening may be effected, for example, by exposing the building material to a curing energy such as thermal energy (e.g., by heating the building material) or to irradiation (e.g., UV or other photo-irradiation), or may be activated chemically, for example, by acid or base activation.

The chemical (e.g., polymerizable) compositions utilized in inkjet 3D printing processes are therefore selected so as to meet the process requirements, namely, exhibiting a suitable viscosity during jetting (thus being non-curable under jetting conditions) and rapid curing or solidification, typically upon exposure to a stimulus on the receiving medium. The building materials may include modeling materials and support materials, which form the object and optionally the temporary support constructions supporting the object as it is being built, respectively. The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, upon exposure to a condition that affects curing of the materials, to form the required layer shape. After printing completion, support structures, if present, are removed to reveal the final shape of the fabricated 3D object.

In order to be compatible with most of the commercially-available printing heads utilized in a 3D inkjet printing system, the uncured building material should feature the following characteristics: a relatively low viscosity (e.g., Brookfield Viscosity of up to 35 cps, preferably from 8 to 25 cps) at the working (e.g., jetting) temperature; Surface tension of from about 25 to about 40 Dyne/cm; and a Newtonian liquid behavior and high reactivity to a selected curing energy, to enable immediate solidification of the jetted layer upon exposure to a curing energy).

The cured modeling material which forms the final object should preferably exhibit heat deflection temperature (HDT) which is higher than room temperature, in order to assure its usability. In most cases, it is also desirable that the object exhibits relatively high Izod Notched Impact (Impact resistance), e.g., higher than 50 or higher than 60 J/m.

Until today, most 3D inkjet methodologies have utilized photopolymerizable materials, and photo-induced curing, typically UV curing, thus narrowing the choice of materials and chemical reactions that can be utilized in this technology. Exemplary photopolymerizable building materials that are currently used in, for example, a "PolyJet" technology (Stratasys Ltd., Israel), are acrylic based materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Building materials obtained by Ring Opening Polymerization (ROP) reactions such as anionic and cationic ring opening polymerizations, exhibit certain valuable properties, such as potentially high curing speed, relatively low shrinkage, high thermal resistance, high impact resistance, and chemical and solvent resistance. These reactions often provide thermoplastic and/or thermosetting materials, which may find many applications upon being engineered by inkjet 3D printing.

An exemplary material which may be suitable for providing such building materials is caprolactam, the precursor of the polyamide Nylon6.

Nylon6, as well as other polyamides, can be prepared by anionic polymerization, by known casting processes such as vertical casting, centrifugal casting or rotocasting. Some industrial production processes of Nylon6 involve mixing two components—molten pre-blends of caprolactam/activator and caprolactam/catalyst, and filling a mold. The polymerization reaction is then completed within a few minutes in the mold.

Commercially available Nylon6 is known as a thermoplastic polymer which exhibits HDT higher than 150° C., and moderate impact resistance of about 40-60 J/m.

The moderate impact resistance of Nylon6 and other polyamides can be improved by using impact modifiers, the most commonly practiced being PEG/PPG-based materials. Additional commonly practiced polyamide impact modifiers include polyols, such as polyetheramine (polyoxyalkylene triamine), commercially available under the trade names Jeffamine® (Huntsman), Polyetheramin (BASF) or PC Amine® (Nitroil), Jeffamine® T-403, Jeffamine® T-3000, Jeffamine® T-5000, Polyetheramine T403, Polyetheramine T5000, PC Amine® TA 403, PC Amine® TA 5000.

The choice of the activator and optionally the impact modifier may provide for a control of the mechanical properties of the polyamide obtained by anionic ROP using currently practiced casting processes.

NYRIM®, for example, is an elastomer-modified AP-Nylon®, or PA6 block copolymer. The characteristics of this copolymer can be selectively controlled, depending on its intended use, by varying the elastomer content. Typically, the elastomer component accounts for between 10% (NYRIM® 1000) and 40% by weight (NYRIM® 4000) of the final product.

Some mechanical properties of NYRIM® compositions are presented in Table 1 below.

TABLE 1

| Parameter | NYRIM® 1000 | NYRIM® 2000 | NYRIM® 3000 | NYRIM® 4000 |
|---|---|---|---|---|
| Modulus of elasticity (tensile test) [MPa] | 2500 | 1700 | 978 | 300 |
| Elongation at fracture [%] | 40 | 270 | 350 | 420 |
| Tensile strength [MPa] | 58 | 47 | 37 | 26 |
| Impact resistance (Izod) at 23° C. [kJ/m$^2$] | 10 | 30 | 62 | No fracture |
| Impact resistance (Izod) at −40° C. [kJ/m$^2$] | 7 | 9 | 16 | No fracture |
| Hardness (Shore D) | 79 | 74 | 67 | 59 |

Additional modifications of anionic polymerization of polyamides, made in order to control the properties of the obtained polymer have been described in the art.

U.S. Patent Application Publication No. 2013/0065466 describes anionic polymerization of polyamides in the presence of polyethyleneimines.

U.S. Pat. No. 9,139,752 describes a process for producing polyamides via anionic polymerization using capped (lactam-blocked) polyisocyanate as an activator (promoter).

U.S. Patent Application Publication No. 2012/0283406 describes compositions comprising an aliphatic or alicyclic di- or multi-isocyanate compound and a lactone, utilized in anionic polymerization of lactam, for controlling the mechanical properties of the obtained polyamide.

EP Patent Application No. 2801588 describes compositions containing N-acetylcaprolactam and (optionally caprolactam-blocked) polyisocyanate compounds based on hexamethylene diisocyanate (HDI), usable in production of polyamide castings.

Several studies have been conducted for finding caprolactam compositions which can be used in inkjet printing processes. In most of these studies, two compositions, one of caprolactam and a catalyst (typically NaH or MgBr or corresponding lactam salts) and one of caprolactam and an activator (typically N-acetylcaprolactam), have been used. See, for example, Khosrow Khodabakhshi, A Doctoral Thesis. Submitted for the award of Doctor of Philosophy of Loughborough University, 2011; Khodabakhshi et al., Solid Freeform Fabrication Proceedings, The University of Texas at Austin, Texas (USA), 2009; Fathi et al., NIP25: International Conference on Digital Printing Technologies and Digital Fabrication, Louisville, Kentucky, September 2009, 784-787; Fathi and Dickens, J. Manuf Sci. Eng. 134(4), 041008 (Jul. 18, 2012).

Additional background art includes GB2382798.

SUMMARY OF THE INVENTION

The present inventors have devised and successfully practiced a methodology for inkjet printing of objects made of chemical compositions which form the building material (e.g., the modeling material) upon curing, while digitally controlling the properties of the obtained building material, at a voxel level. This methodology is based on dual jetting of two or more different compositions, each containing a different material or mixture of materials, which, when contacted, undergo a chemical reaction therebetween to form the building material. The chemical composition of the formed building material is dictated by the number of voxels of each composition in a voxel block. This methodology allows a production of, for example, printed objects which feature different chemical compositions and hence different properties for different voxel blocks, as desired, including properties that are changed gradually or continuously throughout the object as desired, at the voxel block level.

In exemplary embodiments, the methodology described herein is utilized for printing objects made of, or comprising, polyamide forming materials (formed by anionic ROP of caprolactam), while controlling the properties of the objects at the voxel level. The control of these properties is made by dual jetting of one composition that comprises, for example, caprolactam (and/or other curable lactam) and another composition that comprises a promoter of an anionic ring opening polymerization of the caprolactam (referred to herein also as an activator), while controlling the ratio of the compositions at the voxel level, and subjecting the jetted compositions to curing conditions that effect anionic ring opening polymerization of caprolactam. The promoter in such a reaction forms a part of the obtained cured product and can therefore be selected such that its type and amount at a selected voxel block determines the properties of the cured product (e.g., the modeling material).

according to an aspect of some embodiments of the present invention there is provided a method of fabricating an object, the method comprising: receiving three-dimensional printing data corresponding to the shape of the object; selecting a ratio between a first composition and a second composition, wherein the first composition comprises a first material and the second composition comprises a second material, the first and second materials undergoing a chemical reaction with one another so as to form a building material when exposed to a curing energy; dispensing droplets of the first and the second compositions in layers, on a receiving medium, using at least two different inkjet printing heads, according to the printing data; wherein for at least one region of the object, the dispensing of the droplets is selected to form voxel blocks, wherein, for each block, a ratio between a number of voxels of the first composition in the block and a number of voxels of the second composition in the block corresponds to the selected ratio.

According to some of any of the embodiments of the invention selecting the ratio is executed at least twice.

According to some of any of the embodiments of the invention selecting the ratio is executed at least twice for at least one of the layers.

According to some of any of the embodiments of the invention method comprises heating at least one of the first and second compositions prior to the dispensing.

According to some of any of the embodiments of the invention the heating is at a temperature at which each of the first composition and the second composition exhibits a viscosity of no more than 25 centipoises, the temperature being lower than a temperature at which the first material and the second material undergo the chemical reaction.

According to some of any of the embodiments of the invention method comprises exposing the dispensed layers to the curing energy.

According to some of any of the embodiments of the invention the curing energy comprises heat.

According to some of any of the embodiments of the invention the exposing the dispensed layers to the curing energy comprises heating the receiving medium using a resistive heater.

According to some of any of the embodiments of the invention the exposing the dispensed layers to the curing energy comprises irradiating the dispensed layers by heat-inducing radiation.

According to some of any of the embodiments of the invention the dispensing is in a printing chamber and the method comprises heating the printing chamber prior to, during or following the dispensing.

According to some of any of the embodiments of the invention the dispensing and/or exposing to the curing energy is effected under a generally dry and inert environment.

According to some of any of the embodiments of the invention at least one of the first and second compositions comprises an additional material for inducing a chemical reaction between the first and second materials.

According to some of any of the embodiments of the invention the first material is a first curable material.

According to some of any of the embodiments of the invention the second material is selected capable of modifying a chemical, physical and/or mechanical property of a modeling material formed of the first curable material, upon chemically reacting with the first curable material and exposure to the curing energy, and wherein a degree of the modifying is determined by selecting the ratio.

According to some of any of the embodiments of the invention the second material is a second curable material.

According to some of any of the embodiments of the invention the first material comprises a first plurality of monomers and the second material comprises a second plurality of monomers being chemically different from the first plurality of monomers, wherein the first and second pluralities of monomers chemically react with one another upon exposure to the curing energy.

According to some of any of the embodiments of the invention the second material affects cross-linking of a polymeric material formed of the first curable material.

According to some of any of the embodiments of the invention the second material promotes a polymerization of the first curable material upon exposure to the curing energy, while forming a part of a modeling material formed by curing the first curable material.

According to some of any of the embodiments of the invention the first curable material is a monomer that is polymerizable by a ring opening polymerization.

According to some of any of the embodiments of the invention the ring opening polymerization is an anionic ring opening polymerization.

According to some of any of the embodiments of the invention the first curable material is a lactam.

According to some of any of the embodiments of the invention the first curable material is a caprolactam.

According to some of any of the embodiments of the invention the second material comprises at least one material that promotes the anionic ring opening polymerization while forming a part of the modeling material formed by curing the caprolactam.

According to some of any of the embodiments of the invention the second material comprises a moiety that chemically interacts with the caprolactam during the polymerization.

According to some of any of the embodiments of the invention the second material further comprises an additional moiety which is such that when forming a part of a modeling material formed of the caprolactam, a chemical, physical and/or mechanical property of the modeling material is modified.

According to some of any of the embodiments of the invention the additional moiety comprises an elastomeric moiety, and optically-active moiety, a light-absorbing moiety, a hydrophobic moiety, a hydrophilic moiety and/or a chemically-reactive moiety.

According to some of any of the embodiments of the invention the second material is represented by the general Formula I:

$$A\text{-}(R)n \qquad \text{Formula I}$$

wherein: A is the additional moiety; R is N-acyl lactam; and n is a positive integer.

According to some of any of the embodiments of the invention the second material comprises at least two N-acyl lactam groups.

According to some of any of the embodiments of the invention the first composition further comprises a catalyst for inducing polymerization of the caprolactam.

According to some of any of the embodiments of the invention the second composition is devoid of the first curable material.

According to an aspect of some embodiments of the present invention there is provided a method of fabricating an object. The method comprises: receiving three-dimensional printing data corresponding to the shape of the object; selecting a ratio between a first composition and a second composition, wherein the first composition comprises a lactam and the second composition comprises a second material which promotes an anionic ring opening polymerization of the lactam upon exposure to heat to thereby form a polyamide building material; dispensing droplets of the first and the second compositions in layers, on a receiving medium, using at least two different inkjet printing heads, according to the printing data; wherein for at least one region of the object, the dispensing of the droplets is selected to form voxel blocks, wherein, for each block, a ratio between a number of voxels of the first composition in the block and a number of voxels of the second composition in the block corresponds to the selected ratio.

According to some of any of the embodiments of the invention each of the voxel blocks comprises from 2 to 20 voxels.

According to some of any of the embodiments of the invention selecting the ratio is performed for at least two different layers.

According to some of any of the embodiments of the invention selecting the ratio is executed at least twice.

According to some of any of the embodiments of the invention method comprises heating at least one of the first and second compositions prior to the dispensing.

According to some of any of the embodiments of the invention the heating is at a temperature at which each of the first composition and the second composition exhibits a viscosity of no more than 25 centipoises, the temperature being lower than a temperature at which the caprolactam is polymerizable.

According to some of any of the embodiments of the invention method comprises, subsequent to the dispensing, exposing the dispensed layers to the heat.

According to some of any of the embodiments of the invention the exposing the dispensed layers to the heat comprises heating the receiving medium using a resistive heater.

According to some of any of the embodiments of the invention the exposing the dispensed layers to the heat comprises irradiating the dispensed layers by heat-inducing radiation.

According to some of any of the embodiments of the invention the dispensing is effected under a generally dry and inert environment.

According to some of any of the embodiments of the invention a property of the modeling material is determined by selecting the ratio.

According to some of any of the embodiments of the invention the lactam comprises a caprolactam.

According to some of any of the embodiments of the invention the second material comprises at least one material that promotes the anionic ring opening polymerization while forming a part of the modeling material formed by curing the lactam.

According to some of any of the embodiments of the invention the second material comprises a moiety that chemically interacts with the lactam during the polymerization.

According to some of any of the embodiments of the invention the second material comprises at least one moiety which is such that when forming a part of a modeling material formed of the lactam, a chemical, physical and/or mechanical property of the modeling material is modified.

According to some of any of the embodiments of the invention the at least one moiety comprises an elastomeric moiety, and optically-active moiety, a light-absorbing moiety, a conductance modifying moiety, a metal chelating moiety, a hydrophobic moiety, a hydrophilic moiety and/or a chemically-reactive moiety.

According to some of any of the embodiments of the invention the second material is represented by the general Formula I:

A-(R)  Formula I wherein: A is the additional moiety; R is N-acyl lactam; and n is a positive integer.

According to some embodiments of the invention the method wherein the second material comprises at least two N-acyl lactam groups.

According to some of any of the embodiments of the invention the second material is represented by Formula II:

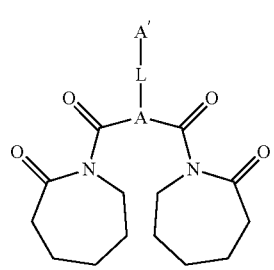

Formula II wherein: A is the additional moiety; L is absent or is a linking moiety; and A' is absent or is another additional moiety, being the same or different from the A.

According to some embodiments of the invention the method wherein A' comprises at least one N-acyl lactam moiety.

According to some of any of the embodiments of the invention the first composition further comprises a catalyst for inducing the ring opening polymerization.

According to some of any of the embodiments of the invention the catalyst is selected from the group consisting of sodium caprolactam and magnesium bromide caprolactam.

According to some of any of the embodiments of the invention the second composition is devoid of caprolactam.

According to an aspect of some embodiments of the present invention there is provided a system for three-dimensional printing. The system comprises: a plurality of inkjet printing heads, each having a plurality of separated nozzles; a user interface for receiving a selected ratio between a first composition and a second composition, wherein the first composition comprises a first material and the second composition comprises a second material, the first and second materials undergoing a chemical reaction with one another so as to form a modeling material when contacted and exposed to a curing energy; and a controller configured for controlling two of the inkjet printing heads to respectively dispense droplets of the first and second compositions in layers, such as to print a three-dimensional object, wherein the controller is configured to form voxel blocks, wherein, for each block, a ratio between a number of voxels of the first composition in the block and a number of voxels of the second composition in the block corresponds to the selected ratio.

According to some of any of the embodiments of the invention the system comprises a waste collection device receiving excessive amounts of the compositions, the waste collection device being constructed for at least one of (i) mechanically breaking reaction product of the compositions formed in the waste collection device, and (ii) maintaining a reduced temperature of the compositions, the reduce temperature being lower than a temperature at which the composition react with each other to form the modeling material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5A:
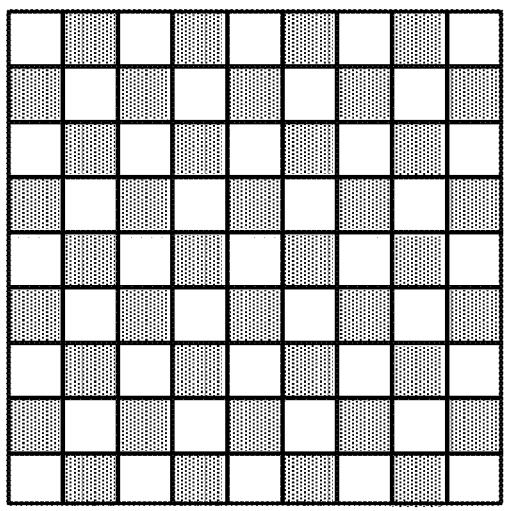
Figure 5B:
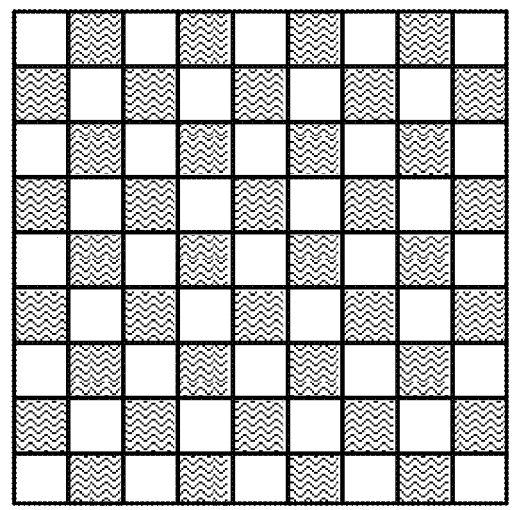

FIGS. 5A and 5B present schematic illustrations of bitmaps in embodiments of the invention in which a "Drop on Drop" printing protocol is employed. A bitmap suitable for the deposition of the first composition is illustrated in FIG. 5A and a bitmap suitable for the deposition of the second composition is illustrated in FIG. 5B. When the droplets of both compositions have the same or approximately the same weight, the bitmaps are useful for a 50:50 (or 1:1) w/w ratio. White boxes represent vacant locations, dotted boxes represent droplets of the first composition and wavy boxes represent droplets of the second composition. Each patterned (wavy/dotted) box represents a pixel (e.g., one composition droplet) in a layer. Both compositions can be deposited at the same location, but different times, during movement of the printing head.

Figure 6A:
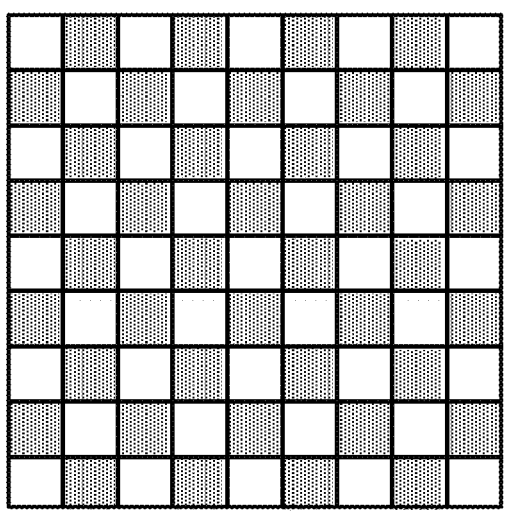
Figure 6B:
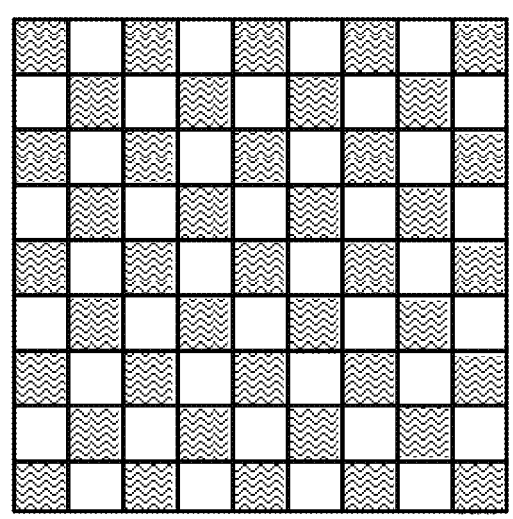

FIGS. 6A and 6B present schematic illustrations of bitmaps in embodiments of the invention in which a "side-by-side" printing protocol is employed. A bitmap suitable for the deposition of the first composition is illustrated in FIG. 6A and a bitmap suitable for the deposition of the second composition is illustrated in FIG. 6B. When the droplets of both compositions have the same or approximately the same weight, the bitmaps are useful for a 50:50 (or 1:1) w/w ratio. White boxes represent vacant locations, dotted boxes represent droplets of the first composition and wavy boxes represent droplets of the second composition. Each patterned (wavy/dotted box represents a pixel (e.g., one formulation droplet). A drop of the first composition (dotted boxes) is deposited adjacent to a drop of the second composition.

DESCRIPTION OF SPECIFIC EMBODIMENTS OF THE INVENTION

The present invention, in some embodiments thereof, relates to three-dimensional printing and, more particularly, but not exclusively, to methods of performing three-dimensional inkjet printing, to compositions utilized in these methods and to objects obtained by these methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

A major advantage of 3D printing by ink jet technology comes from the ability to control every voxel in the printed layer so that a multi-material object may be produced, in which there is a predetermined distribution of materials over the voxels.

Herein throughout, the phrase "building material" describes two major categories of material: 'modeling material', i.e., the hardened (cured) material that forms the final product (e.g., object) of the 3D printing process, and 'support material'.

The phrases "hardened building material", "cured building material" and simply "building material" as used herein refer to the material obtained after dispensing droplets of uncured formulations, and after a chemical reaction occurred between the first and second compositions, preferably, after curing energy is applied, unless otherwise stated. Whenever reference is made to building material formulations used before dispensing the droplets and before curing energy is applied, it is referred to herein as "uncured building material" or "uncured building material formulation" or simply as "building material formulation".

The terms "composition" and "formulation" are used herein throughout interchangeably.

The support material serves as a supporting matrix for supporting the object or object parts during the fabrication process and/or other purposes, e.g., for hollow or porous objects, or to support overhangs. The support material, when cured, is preferably water dispersible to facilitate its removal once the buildup of object is completed. The formulation (composition) used to form the cured support material is preferably dispensed in liquid form and is typically curable by radiation, such as, but not limited to, electromagnetic radiation (e.g., ultraviolet radiation, visible light radiation, infrared radiation), and electron beam radiation, so as to form the support material. Also contemplated are support materials which comprise a wax component, and, optionally, also a viscosity modifying component. These types of support materials are in liquid form at the inkjet printing temperatures, solidify once cooled after being dispensed, and do not require curing by radiation.

The modeling material is generally made of a formulation (composition) which is formulated for use in inkjet technology and which forms the three-dimensional object, typically upon curing. The modeling material is generally made of a curable (base) material composition, formulated for use in inkjet technology, and which is able to form the three-dimensional object on its own, i.e., without having to be mixed or combined with any other substance. The base material is preferably dispensed in liquid form and is curable by radiation, such as, but not limited to, electromagnetic radiation (e.g., ultraviolet radiation, visible light radiation, infrared radiation), and electron beam radiation, or by heat delivered convectively or conductively, as to form the (cured) modeling material.

The phrase "modeling material" is also referred to herein and in the art as "model material" and refers to the modeling material obtained after dispensing droplets of uncured modeling material formulations (e.g., the first and second compositions as described herein), and after a chemical reaction occurred between the first and second compositions, preferably, after curing energy is applied, unless otherwise stated. This phrase is also referred to herein as cured modeling material or hardened modeling material. Whenever reference is made to modeling material formulations used before dispensing the droplets and before curing energy is applied, it is referred to herein as "uncured modeling material", "uncured model material" or "uncured modeling material formulation" or simply as "modeling material formulation".

In some embodiments of the invention both the support and the modeling materials are obtained using the same type of curing.

The final three-dimensional object that is fabricated is typically made of only the cured modeling material or materials. In some embodiments of the present invention the three-dimensional object or parts of the object may be made of a combination of cured modeling and support materials.

Herein throughout, the phrase "base material" describes the material that is jetted during the inkjet printing, which cures (e.g., polymerizes) to form the cured modeling material. The phrase "base material" describes an uncured formulation (composition), or a mixture of uncured formulations (compositions) that upon curing forms a cured modeling material as described herein.

The phrase "multi-material model", as used herein and in the art, describes a printed object (model) featuring macroscopic domains of different modeling materials in at least a portion thereof, for example, a printed object that is comprised of portions having different properties, e.g. mechanical properties, such as flexibility, rigidity, elasticity and so on, such that, for example, a printed object may comprise a combination of a flexible portion and a rigid portion. This phrase encompasses an object featuring domains of different modeling materials, wherein the modeling materials differ from one another by the ratio of the compositions (formulations) that are used to form the modeling material.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

The present inventors have now designed a methodology for inkjet printing, via separate printing heads, two or more compositions, which form, upon chemically reacting with one another, a hardened (cured) building material. The present inventors have shown that the chemical composition of the hardened building material can be digitally controlled, by controlling the ratio of the jetted compositions at a voxel level. As demonstrated in the Examples section that follows, the present inventors have demonstrated that practicing this methodology by dual jetting of a caprolactam composition containing a catalyst, and another composition containing a material that participates in the polymerization of caprolactam (e.g., a promoter), while controlling the number of voxels of each composition and particularly the ratio between these numbers of voxels, results in tailor-made, multiple cured building (e.g., modeling) materials which may be designed to exhibit a plethora of mechanical and chemical properties, at the voxel level.

The present inventors have shown that changing the ratio of voxels of each composition which are adjacent to one another, results in cured polymers which exhibit different chemical compositions and different chemical, physical and/or mechanical properties, whereby these structures and properties are controllable at a level of few voxels (e.g., from 2 to 100 voxels or from 2 to 80 voxels or from 2 to 60 voxels or from 2 to 40 voxels or from 2 to 30 voxels or from 2 to 20 voxels or from 2 to 10 voxels or from 2 to 8 voxels or from 2 to 6 voxels or from 2 to 4 voxels or from 10 to 80 voxels or from 10 to 60 voxels or from 10 to 40 voxels).

Such a methodology results in printed objects in which the properties of portions of these objects are controlled at a resolution of a few voxels.

The Method

Figure 1:
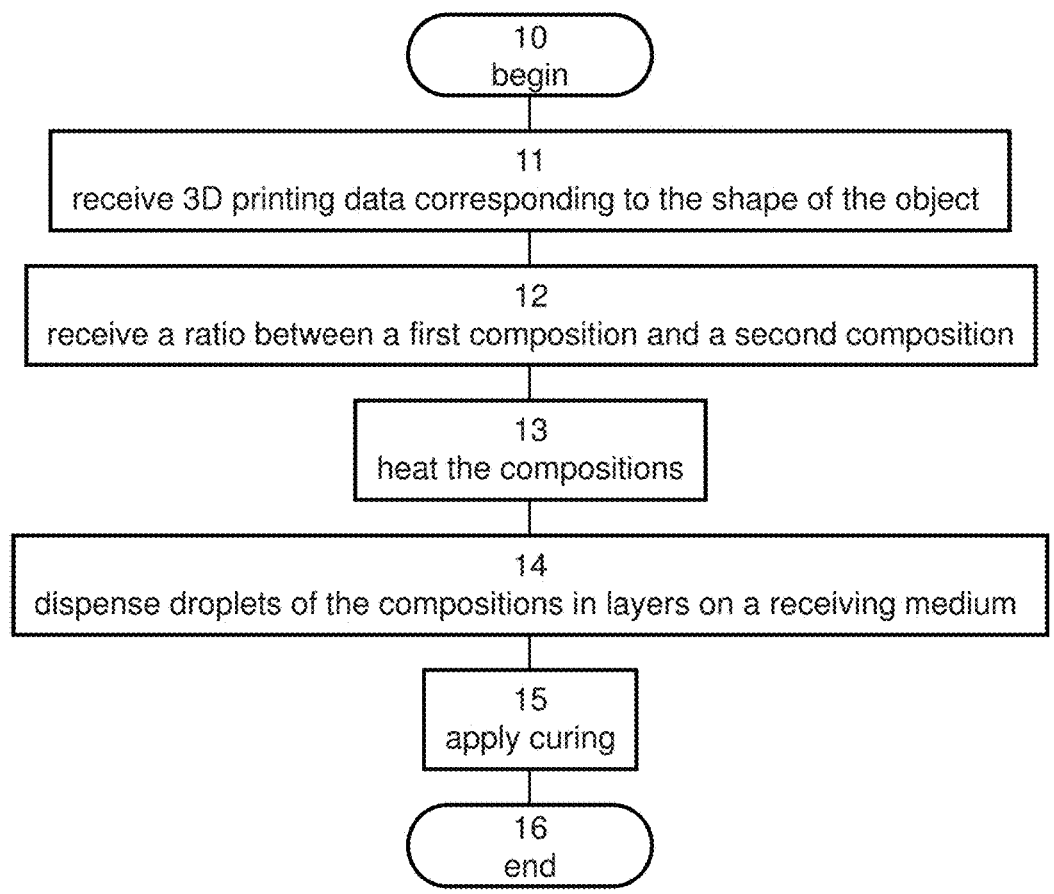
FIG. 1 is a flowchart diagram of a method suitable for fabricating an object by three-dimensional (3D) inkjet printing according to aspects of some embodiments of the present invention.

FIG. 1 is a flowchart diagram of a method suitable for fabricating an object by three-dimensional (3D) inkjet printing according to aspects of some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which 3D printing data corresponding to the shape of the object is received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

At 12 a ratio between a first composition and a second composition is received. While the embodiments below are described with a particular emphasis on a ratio between two compositions, it is to be understood that more detailed reference to a ratio between two compositions is not to be interpreted as indicating that embodiments in which a ratio between more than two compositions are not contemplated. Thus, embodiments of the present invention contemplate receiving a ratio between N compositions, where N is at least 2, and can be 2, 3, 4, or more. The ratio is typically expressed in terms of the volumes of the respective compositions, but may also be expressed in terms of other extensive physical properties, such as the weights of the respective compositions. A representative example of a received ratio for two compositions is X1:X2, where X1 and X2 are the extensive physical properties (e.g., weight, volume) of the first and second compositions. A representative example of a received ratio for three or more compositions is X1:X2: . . . :XN, where N is the number of the compositions (N>2, in the present example) and X1, X2, . . . , XN are the extensive physical properties (e.g., weight, volume) of the respective compositions.

The ratio can be received as a user input or can be obtained from an external source, such as, but not limited to, a computer that calculates the ratio and transmits it to the method. At least two of the compositions comprise substances (materials) that react chemically with one another to form a building (e.g., modeling) material. The properties of the building (e.g., modeling) material that is formed by the chemical reaction typically depend on the selected ratio. The computer can thus calculate the ratio based on the desired properties of the building (e.g., modeling) material. Also contemplated are embodiments in which instead of receiving the ratio the method receives building (e.g., modeling) material properties and calculates the ratio based on the received properties.

Optionally, the method continues to 13 at which the first and/or second compositions are heated. These embodiments are particularly for compositions that are either solid or are liquid yet have relatively high viscosity at the operation temperature of the working chamber of the 3D printing system. The heating of the composition(s) is preferably to a temperature that allows jetting the respective composition through a nozzle of a printing head of a 3D printing system. In some embodiments, the heating of the composition is to a minimal temperature at which the respective composition is in a liquid form, e.g., above the highest melting point of a material in the composition. In some embodiments of the present invention, the heating is to a temperature at which the respective composition exhibits a viscosity in a range of from about 8 centipoises and up to no more than X centipoises, where X is about 35 centipoises, or about 30 centipoises, preferably about 25 centipoises and more preferably about 20 centipoises, or 18 centipoises, or 16 centipoises, or 14 centipoises, or 12 centipoises, or 10 centipoises, and at which the composition cannot undergo thermal curing (e.g., below a temperature at which curing, as defined herein, can be effected). Thus, denoting the temperature at which the viscosity of the respective composition is X centipoises by $T_1$ and the temperature at which thermal curing is effected for that composition by $T_2$, the heating at 13 is preferably to a temperature T satisfying $T_1 < T < T_2$.

The heating 13 can be executed before loading the respective composition into the printing head of the 3D printing system, or while the composition is in the printing head or while the composition passes through the nozzle of the printing head.

In some embodiments, heating 13 is executed before loading of the respective composition into the printing head, so as to avoid clogging of the printing head by the composition in case its viscosity is too high.

In some embodiments, heating 13 is executed by heating the printing heads, at least while passing the first and/or second composition(s) through the nozzle of the printing head.

In some embodiments, both the first and second (or all other) compositions are heated, and in some embodiments, only one (or more) of the compositions is heated, while the other composition(s) exhibit a desired viscosity of less than 25 centipoises at ambient temperature.

The method continues to 14 at which droplets of the compositions are dispensed in layers, on a receiving medium, using at least two different multi-nozzle inkjet printing heads, according to the printing data. The receiving medium can be a tray of a three-dimensional inkjet system or a previously deposited layer.

In some embodiments of the present invention, the dispensing 14 is effected under a generally dry and inert environment.

As used herein "generally dry environment" means an environment having a relative humidity of less than 50% or less than 40% or less than 30% or less than 20% or less than 10%, preferably less than 5%, or less than 2% or less than 1% or less.

As used herein "inert environment" means an environment that is substantially free of oxygen, carbon dioxide, water and/or any other substances that may chemically react with the first and second compositions or otherwise interfere in the chemical reaction between substances in the first and second compositions.

As used herein, "substantially free" means less than 1% or less than 0.5%, or less than 0.1%, or less than 0.05%, or less than 0.01% of a substance that may interfere in the chemical reaction.

An inert environment can be established by supplying an inert gas or an inert gas mixture into the working chamber of the 3D printing system. Representative examples of an inert gas include, but are not limited to, nitrogen and/or argon.

In some embodiments, the inert environment is a dry inert environment, such as dry nitrogen and/or argon.

Accordingly, as used herein, "inert" environment or "inert" atmosphere is not limited to an environment consisting of inert gases, but can mean either an inert gas, a mixture of inert gases, or a vacuum.

The method optionally and preferably continues to 15 at which curing energy is applied to the deposited layers. Preferably, the curing is applied to each individual layer following the deposition of the layer and prior to the deposition of the previous layer.

In some embodiments, the applied curing energy in 15 is thermal energy.

Applying thermal energy can be effected, for example, by heating a receiving medium onto which the layers are dispensed. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

Alternatively, or in addition, the applied curing energy is electromagnetic irradiation, as described herein.

In some embodiments, two or different curing energies are applied. In some of these embodiments, curing energy of a first type is applied and then curing energy of a second type is applied. For example, the first curing energy can be in the form of UV radiation and the second curing energy can be in the form of thermal energy delivered by convection, conduction and/or radiation.

In some embodiments, applying a curing energy is effected under a generally dry and inert environment, as described herein.

The method ends at 16.

In some embodiments, the method is effected such that for at least one region of the object, the dispensing of the droplets is selected to form voxel blocks, wherein, for each block, a ratio between a number of voxels of the first composition in the block and a number of voxels of the second composition in the block corresponds to the selected ratio between the at least first and second compositions.

Figure 2:
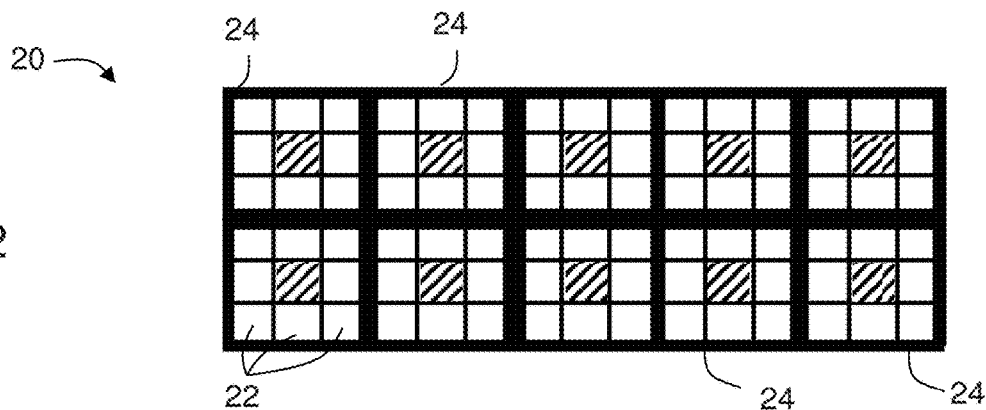
FIG. 2 is a schematic illustration of a layer having a plurality of voxels arranged in blocks, according to some embodiments of the present invention.

These embodiments are illustrated in FIG. 2 which shows a layer 20 having a plurality of voxels 22 arranged in blocks 24.

Herein throughout, the term "voxel" describes a volume element deposited by a single nozzle of a three-dimensional printing system.

Herein throughout, the term "voxel block" describes a group of voxels wherein each voxel in the group is adjacent to at least one other voxel in the group.

Voxels occupied with the first composition are shown in FIG. 2 as white and voxels occupied with the second composition are marked in FIG. 2 with hatching. In the representative example of FIG. 2, which is not intended to be limiting, each block includes 9 voxels, wherein the ratio between a number of voxels of the first composition and a number of voxels of the second composition in the block is 8:1.

In various exemplary embodiments of the invention the ratio 8:1 corresponds to the ratio received or calculated at 12. For example, when the same amount (e.g., weight, volume) of composition is deposited onto each voxel, the ratio between the number of voxels can be the same as the ratio received or calculated at 12. When the amount of composition in a voxel occupied with the first composition is not the same as the amount of composition in a voxel occupied with the second composition, the ratio between the numbers of voxels is obtained by correcting the ratio received or calculated at 12 using the amounts in the respective voxels. In other words, the ratio between the numbers of voxels in a block is selected such that the ratio between the amounts of compositions deposited within the block approximately equals the ratio received or calculated at 12. As a representative example, consider a process in which the method receives a ratio X1:X2=4:1, and in which the amount of the first composition per voxel is 2 times the amount of the second composition per voxel. In this case, a ratio of 8:1 between the number of voxels corresponds to a ratio of 4:1 between the amounts since 8/2=4/1. The correction of the ratio the ratio received or calculated at 12 using the amounts in the respective voxels, can be done by a controller that is integrated in the three-dimensional printing system (e.g., controller 52, see FIG. 4 described below), or, alternatively by a data processor or a computer that is external to the three-dimensional printing system (e.g., computer 54, see FIG. 4 described below).

In some embodiments, a ratio is selected between a first composition and a second composition.

In some embodiments, a ratio is selected between three or more compositions, that is a first composition, a second composition, a third composition, and optionally a fourth composition, a fifth composition and so on.

For simplicity, the following description relates to embodiments where a first and a second composition are used. However, it is to be noted that embodiments in which more than two compositions are utilized are also contemplated, as stated hereinabove.

In some embodiments, each voxel block as defined herein comprises from 2 to 100 voxels or from 2 to 80 voxels or from 2 to 60 voxels or from 2 to 40 voxels or from 2 to 30 voxels or from 2 to 20 voxels or from 2 to 10 voxels or from 2 to 8 voxels or from 2 to 6 voxels or from 2 to 4 voxels or from 10 to 80 voxels or from 10 to 60 voxels or from 10 to 40 voxels.

In some preferred embodiments of the invention each droplet occupies a single voxel upon deposition of the droplet. Thereafter, and before curing, the droplet may spread to one or more adjacent voxels.

It is appreciated that more than one ratio between the compositions can be received or calculated. When more than one ratio between the compositions is employed, different ratios can correspond to different layers or different regions in the same layer. These embodiments are illustrated in FIGS. 3A and 3B.

Figure 3A:
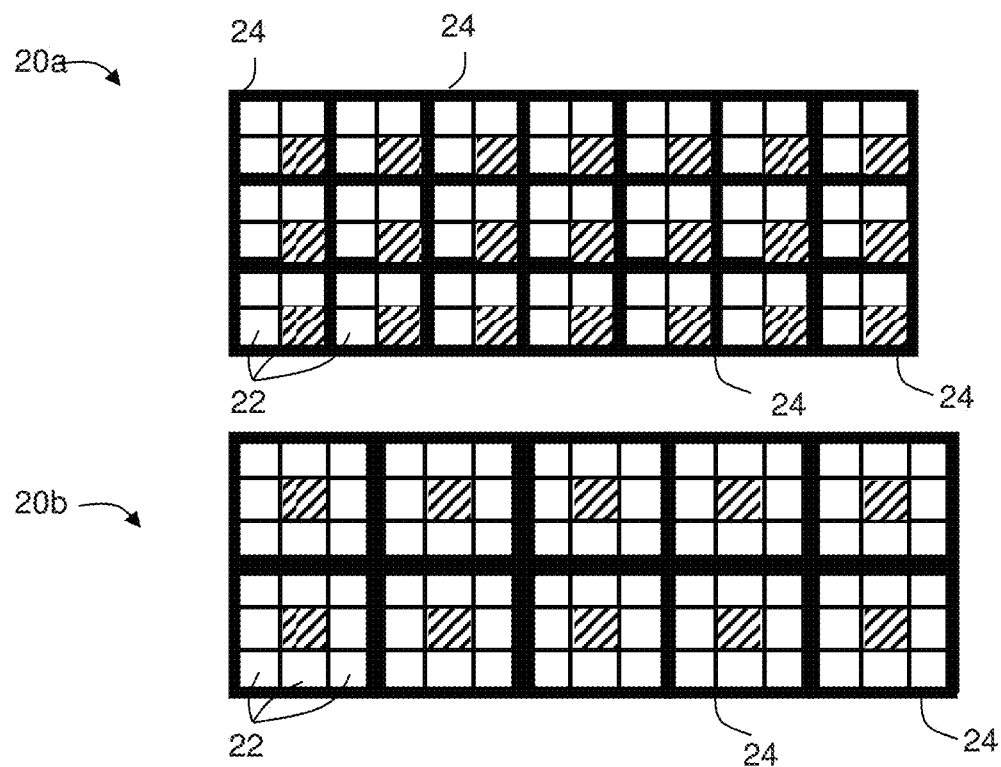
FIG. 3A is a schematic illustration of two layers, each having a plurality of voxels arranged in blocks, according to some embodiments of the present invention.

FIG. 3A illustrates two layers 20a and 20b, each having a plurality of voxels 22 arranged in blocks 24. In layer 20a each block includes 3 voxels of the first composition and 1 voxel of the second composition, and in layer 20b each block includes 8 voxel of the first composition and 1 voxel of the second composition. Since different ratios between the compositions correspond to different properties of the building (e.g., modeling) material formed by the reaction of the compositions with each other, the different ratios in layers 20a and 20b can be selected to ensure that the properties of the building (e.g., modeling) materials formed in each layer are also different.

Figure 3B:
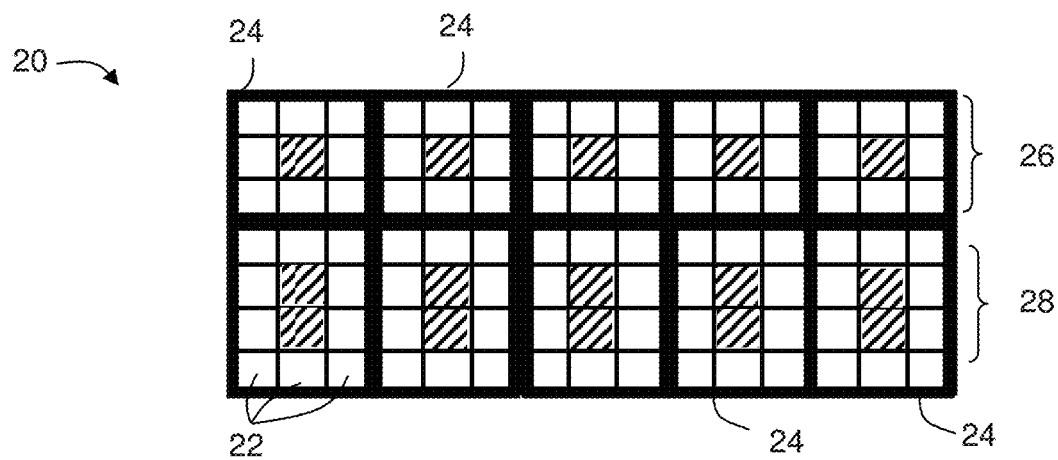
FIG. 3B is a schematic illustration of a layer having two regions, according to some embodiments of the present invention.

FIG. 3B illustrates a layer 20 having two regions designated 26 and 28. In the representative example of FIG. 3B, which is not intended to be limiting, each block in region 26 includes 9 voxels, and each block in region 28 includes 12 voxels. Region 26 includes blocks of voxels wherein the ratio between a number of voxels of the first composition and a number of voxels of the second composition in each block is 8:1; and region 28 includes blocks of voxels wherein the ratio between a number of voxels of the first composition and a number of voxels of the second composition in each block is 12:2.

Since different ratios between the compositions correspond to different properties of the building (e.g., modeling) material formed by the reaction of the substances in the compositions with each other, the different ratios in regions 26 and 28 can be selected to ensure that the properties of the building (e.g., modeling) materials formed in each region of the same layer are also different.

In any of the above embodiments, the first and second compositions begin to mix within each block 24 following their deposition on the receiving medium, typically upon being exposed to curing energy. The mixing and/or curing results in a building (e.g., modeling) material which is optionally and preferably chemically different to any of the first and second compositions and which occupies most or all the voxels in the respective block 24. Preferably, the distribution of the building (e.g., modeling) material, once formed, is generally uniform over the entire block 24.

As used herein "generally uniform distribution" means a deviation from uniformity of less than 30% or 20% or less than 10% or less than 5%.

The distribution of the building (e.g., modeling) material can be measured with respect to any extensive property, including, without limitation, weight and volume.

In some embodiments, all the voxels in at least one voxel block participate in a reaction between the first and second compositions, such that the cured building material that results from the reaction, following the exposure to the curing energy, is substantially homogenous.

As used herein, "substantially homogenous" means that the building material in a voxel block vary in weight percent of its ingredients by less than 10% or less than 8% or less than 6% or less than 4% or less than 2% or less than 1% or less than 0.5% or less than 0.25%.

To ensure reaction between the first and second compositions, the deposition of the compositions can be performed in more than one way.

In some embodiments of the present invention a "Drop on Drop" printing protocol is employed. These embodiments are schematically illustrated in FIGS. 5A and 5B. A bitmap suitable for the deposition of the first composition is illustrated in FIG. 5A and a bitmap suitable for the deposition of the second composition is illustrated in FIG. 5B. White boxes represent vacant locations, dotted boxes represent droplets of the first composition and wavy boxes represent droplets of the second composition. The printing data in these embodiments are such that for each layer, both compositions are deposited at the same location, but different times, during movement of the printing head. For example, each droplet of a first composition can be jetted on top of a droplet of a second composition, or vice versa. Preferably, but not necessarily, the two formulation parts are jetted in drops at the same weight and/or rate. These embodiments are particularly useful when the desired weight ratio is 1:1. For other desired weight ratios, the two formulation parts are preferably jetted in drops of different weights, wherein the ratio of the weights corresponds to the desired ratio.

A representative example for a resolution suitable for the present embodiments is 1200 dpi in the X direction and 300 dpi in the Y direction. The drop on drop printing protocol allows the two types of drops to combine and mix before the crystallization of deposited material.

In some embodiments of the present invention a "side by side" printing protocol is employed. These embodiments are schematically illustrated in FIGS. 6A and 6B. A bitmap suitable for the deposition of the first composition is illustrated in FIG. 6A and a bitmap suitable for the deposition of the second composition is illustrated in FIG. 6B. The white, dotted and wavy boxes represent vacant locations, droplets of the first composition and droplets of the second composition, respectively. The printing data in these embodiments is such that for each layer, each drop of a first composition is jetted adjacent to a drop of a second composition, or vice versa. Due to drop spreading, the adjacent drops tend to partially overlap. As a result, the two drops diffuse toward each other, mix and react after deposition.

In the schematic illustrations shown in FIGS. 5A-6B, chessboard bitmaps are illustrated, but this need not necessarily be the case, since, for some applications, other bitmap patterns can be employed.

In some of any of the embodiments described herein, the building material further comprises a support material.

In some of any of the embodiments described herein, dispensing a building material formulation (uncured building material) further comprises dispensing support material formulation(s) which form the support material upon application of curing energy.

Dispensing the support material formulation, in some embodiments, is effected by inkjet printing head(s) other than the inkjet printing heads used for dispensing the first and second (and other) compositions forming the modeling material.

In some embodiments, exposing the building material to curing energy includes applying a curing energy that affects curing of a support material formulation, to thereby obtain a cured support material.

In some of any of the embodiments described herein, once a building material is cured, the method further comprises removing the cured support material. Any of the methods usable for removing a support material can be used, depending on the materials forming the modeling material and the support material. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a composition is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction is therefore typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

A "curing energy" typically includes application of radiation or application of heat, as described herein.

A curable material or system that undergoes curing upon exposure to electromagnetic radiation is referred to herein interchangeably as "photopolymerizable" or "photoactivatable" or "photocurable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an JR lamp or Xenon lamp, operated to emit radiation onto the deposited layer.

In some embodiments, heating is effected by infrared radiation applied by a ceramic lamp, for example, a ceramic lamp that produces infrared radiation of from about 3 µm to about 4 µm, e.g., about 3.5 µm.

In some of any of the embodiments described herein, the method further comprises exposing the cured modeling material, either before or after removal of a support material formulation, if such has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat, the post-treatment can be effected for a time period that ranges from a few minutes (e.g., 10 minutes) to a few hours (e.g., 1-24 hours).

The Compositions:

In some of any of the embodiments described herein, the first and second compositions chemically react with one another to form the building (e.g., modeling) material.

By "chemically reacting" and any grammatical diversion thereof, it is meant that two or more substances (materials) in the compositions undergo a chemical reaction that leads to a bond formation. The bond can be an ionic bond, a hydrogen bond, or a covalent bond, and is preferably a covalent bond.

In some of any of the embodiments described herein, the chemical reaction occurs once the first and second compositions are being contacted with one another.

By "being contacted" it is meant that the first and second compositions are in a proximity that enables a chemical reaction between two or more substances in the compositions to occur. An exemplary suitable proximity, in the context of the present embodiments, is, for example, of adjacent voxels within a layer of dispensed drops, and/or of drops deposited one onto (on top of) the other within the same voxel of a layer.

For example, by forming one or more voxels of the first composition and one or more adjacent voxels of the second composition, the first and second chemical compositions are contacted and a chemical reaction occurs.

In some of any of the embodiments described herein, the chemical reaction occurs upon exposure to a curing energy, as defined herein.

In some of any of the embodiments described herein, the first composition comprises at least a first material and the second composition comprises at least a second material, and the at least first and second materials chemically react to form the building (e.g., modeling) material upon being contacted and exposed to curing energy.

Each of the first and second compositions may comprise additional materials, which may or may not form a part of the building (e.g., modeling) material formed upon contacting the first and second compositions. Such additional materials may participate in the chemical reaction that forms the building (e.g., modeling) material. Alternatively, such additional materials induce the chemical reaction, yet may not form a part of the building (e.g., modeling) material. Exemplary such materials include, but are not limited to, catalysts, initiators, pH-adjusting agents, viscosity modifying agents, surface tension modifiers, and the like.

In some of any of the embodiments described herein, the ratio between materials included in the first composition (e.g., a first material) and materials included in the second composition (e.g., a second material), which chemically react to form a building (e.g., modeling) material, determines the chemical composition of a building material, for example, by determining the stoichiometric ratio between in the materials in the product of the chemical reaction.

By selecting a ratio of the number of voxels of the first composition and the number of voxels of the second composition, in a voxel block where the first and second compositions are dispensed and chemically react, a chemical composition of the building material is determined. Selecting different ratios of the first and the second compositions, and thus of the first and second materials, for each voxel block, results in building materials of different chemical compositions in each voxel block.

This enables obtaining a printed object in which at least two, and preferably much more, voxel blocks exhibit different properties, such as chemical properties, mechanical properties, thermal properties, optical properties, as described in further detail hereinbelow, based on the selected ratio.

It is to be noted that embodiments where one or both compositions comprise both a first material and a second material that chemically react with one another to form the building (e.g., modeling) material are also contemplated. In such embodiments, the first and second materials do not react, or react slowly, with one another, without the presence of an additional material, in which case only one of the compositions further comprises such an additional material. Alternatively, in such embodiments, the first and second materials do not react, or react slowly, with one another, without being subjected to conditions that effect the reaction. In these embodiments, a ratio of the first and second materials in each composition is considered for selecting a ratio of the first and second compositions.

In some of any of the embodiments described herein, one or both of the first and second compositions comprises a curable material, which may form a building (e.g., modeling) material upon being exposed to a curing energy.

The curable material is typically a monomer or a mixture of monomers, but can also be an oligomer or a mixture of oligomers, or a short-chain polymer or a mixture of such polymers, which undergoes a chemical reaction to produce a hardened or solidified (cured) building (e.g., modeling) material.

It is to be noted that herein throughout, whenever the curable material is referred to as a monomer, it is meant to encompass also an oligomer, a short-chain polymer, or any mixture of monomers, oligomers and/or short-chain polymers, unless specifically indicated otherwise.

Such a chemical reaction is referred to herein and in the art as "curing", and typically includes polymerization of the monomer(s) or oligomer(s) and/or cross-linking of the polymeric chains (either present before curing or formed in a polymerization of the monomers or oligomers). The product of a curing reaction, which is the cured building material, is therefore typically a polymeric material.

Herein, a curable material which can be used per se for forming a building material, when subjected to a suitable curing energy, optionally in the presence of catalysts or activators or additional materials that promote or induce curing, is also referred to as a "base material", as defined herein.

In some of any of the embodiments described herein, the curing is effected when a curable material as defined herein is exposed to a curing energy. The curing energy can be as described herein.

In some embodiments, the curing energy comprises heat. Curing by exposure to heat is also referred to herein and in the art as "thermal curing".

A curable material that undergoes a curing reaction when exposed to heat is referred to herein and in the art as "thermally-curable material".

In some of any of the embodiments described herein, a curable material is a monomer or a mixture of monomers which can form a polymeric building (e.g., modeling) material upon a polymerization reaction, when exposed to curing energy at which the polymerization reaction occurs.

In some of any of the embodiments described herein, the first composition comprises a first material which is a curable material as described herein. The curable material in the first composition is also referred to herein as a "first curable material". In some embodiments, the first curable material can be used per se for forming a building material, when subjected to suitable reaction conditions (curing energy), optionally in the presence of catalysts and/or activators.

In some of any of the embodiments described herein, the second composition comprises a second material, which participates in the chemical reaction in which a building material is formed of the first curable material.

In some embodiments, the second material, by chemically reacting with the first material, as defined herein, forms a part of the cured building material that is formed of the first curable material, when the first and second materials are exposed to a curing energy.

In some of any of the embodiments described herein, the second material is selected as being capable of modifying a property (e.g., a chemical, physical, thermal and/or mechanical property) of a building material formed of the first curable material, when chemically reacting with the first curable material upon exposure to a curing energy.

That is, a building material formed as a result of a chemical reaction between the first and the second materials has at least one property that is different from a respective property of a building material formed upon curing only the first curable material. This property may also depend on the ratio of the first and second materials participating in the reaction.

It is to be noted that, in some embodiments, the different chemical property is not a result of a physical mixture of the two compositions but rather a result of a chemical reaction that occurs between the first and the second compositions upon contacting one another and being exposed to a curing energy.

It is to be further noted that both the first and second compositions are preferably exposed to the same curing energy under which the chemical reaction occurs. However, different curing energies, or a combination of curing energies, are also contemplated.

It is to be further noted that subjecting the first and second compositions, including at least the first and second materials, to chemical reaction, upon contacting the compositions and exposure to curing energy, results in a polymeric material, which is different from a polymeric material that is formed when each of the compositions is subjected alone to curing energy, even if such polymeric materials are physically mixed. That is, for example, the second material chemically reacts with the first material when both are subjected to the same curing energy, and the obtained polymeric material is different from a polymeric material formed upon curing a first material, a polymeric material formed upon curing a second material, and/or a physical mixture of such polymeric materials. The polymeric material structure and/or properties also depend on the ratio between the materials getting in contact and exposed to curing energy.

As described herein, selecting a ratio of the first and second compositions determines a chemical composition of the building (e.g., modeling) material within a voxel block.

A property of the building (e.g., modeling) material which is modified by the second material, at a voxel level, can be, for example, a mechanical property, a physical property or a chemical property.

Mechanical properties which can be modified by the second material include, for example, elasticity, elongation at fracture, impact resistance at ambient temperature and/or at a low temperature, Shore hardness, heat deflection temperature (HDT), tear resistance, tensile strength, impact strength, flexural strength, creep resistance, and any additional mechanical property relevant to the formed building material, as would be readily recognized by those skilled in the art.

Physical properties which can be modified by the second material include, for example, optical activity, light absorbance or transmittance, conductivity, crystallinity, phase transition temperature (e.g., Tm), and any additional physical property relevant to the formed building material, as would be readily recognized by those skilled in the art.

Chemical properties which can be modified by the second material include, for example, hydrophobicity, hydrophilicity, chemical reactivity, solubility, adhesion, surface roughness, and any additional physical property relevant to the formed building material, as would be readily recognized by those skilled in the art.

In some of any of the embodiments described herein, the degree by which a property of the building material is modified (with respect to a building material made of only the first curable material) is determined by selecting the ratio between the first and second compositions, and hence between the first and second materials.

For example, when a first curable material chemically reacts with a second material to form a building material that has a higher elasticity compared to a building material formed of the first curable material in the absence of the second material, the ratio between the first and the second compositions determines the degree of elasticity of the building material, at a selected voxel block.

In another example, when a first curable material chemically reacts with a second material to form a building material that has a higher hydrophobicity compared to a building material formed of the first curable material in the absence of the second material, the ratio between the first and the second composition determines the degree of hydrophobicity of the building material, at a selected voxel block.

In another example, when a first curable material chemically reacts with a second material to form a building material that has a higher Impact resistance compared to a building material formed of the first curable material in the absence of the second material, the ratio between the first and the second composition determines the Impact resistance of the building material, at a selected voxel block.

Co-Polymerizable Compositions:

In some of any of the embodiments described herein, the chemical reaction between the first and second materials is co-polymerization.

In these embodiments, a mixture of curable monomers (or oligomers) is used to form the building (e.g., modeling) material such that the latter is a co-polymer composed of this mixture of monomers, e.g., composed of repeating backbone units derived from one type of monomer (or oligomer) and repeating backbone units of another type of monomer (or oligomer), covalently linked therebetween in any order. In some embodiments, a co-polymer is formed of a mixture of monomers that are curable under the same curing conditions (e.g., in the presence of the same polymerization catalysts/activators and/or when exposed to the same curing energy). A chemical composition of such a co-polymer is determined by the molar ratio of each of the curable monomers when polymerization occurs.

In some of the any of the embodiments described herein the second material is also a curable material, which is chemically different from the first curable material. When the second material is a curable material, it is referred to herein as a second curable material.

The second curable material, according to some of these embodiments is curable under the same conditions and upon exposure to the same curing energy as the first curable material.

In some embodiments, both the first and the second curable materials are monomers, which form a polymeric material under the same type of polymerization reaction.

In some embodiments, the first material comprises a first plurality of monomers and the second material comprises a second plurality of monomers which is chemically different from the first plurality of monomers. When contacted and exposed to a suitable curing energy, and the first and second pluralities of monomers chemically react with one another to form a co-polymeric building material.

In some of these embodiments, one of the compositions comprises one or more types of monomers (or oligomers), referred to as a part of the base material, and the other composition comprises one or more other types of monomers (or oligomers), also referred to herein as a part of the base of material.

In these embodiments, both the first and second compositions comprise a part of the base material, yet each composition comprises a different part of the base material, and a chemical reaction between these parts occurs for forming the building (e.g., modeling) material.

When the two compositions chemically react, the building (e.g., modeling) material is formed via co-polymerization of the monomers (or oligomers).

In these embodiments, both the first and second materials, in the first and second compositions, form the base material.

These embodiments are described herein interchangeably as referring to a first composition which comprises a part of the base material and a second composition which comprises another part of the base material. One of the parts of the base material can also be regarded as a second material that chemical reacts with the part of the base material in the other composition, to form the building (e.g., modeling) material.

In these embodiments, the second material forms a part of the building (e.g., modeling) material upon chemically reacting with the base material.

In exemplary embodiments, the second material is a second curable material which co-polymerizes with the first curable material, as described herein, and the second curable material comprises monomers which are more hydrophobic compared to the first curable material, thus modifying the hydrophobicity of the building material.

For example, the second curable material may comprise monomers which are substituted by a hydrophobic moiety, whereby the hydrophobic moiety does not participate in the polymerization of the monomers when exposed to curing energy. When contacting such a second curable material with a first curable material which comprises monomers that do not have a hydrophobic moiety, exposing to curing energy, and selecting a ratio of the first and second compositions, the hydrophobicity of the co-polymer that forms the building material can be digitally controlled.

Similarly, the second curable material may comprise monomers which are substituted by a chemically-reactive group, or a conductive group (e.g., a charged group), or a hydrophilic group, or a light-absorbing group, as defined herein, such that selecting a ratio of the first and second compositions results in modifying a respective property of a building material made of the first curable material.

In alternative embodiments, a mixture of curable monomers (or oligomers) is used to form the building (e.g., modeling) material, whereby a polymerized material formed of at least one of the curable materials interacts with a polymerized material formed of another (e.g., a second curable material) by, for example, cross-linking. A chemical composition of such a co-polymer is determined by the molar ratio of each of the curable monomers when polymerization occurs.

In further alternative embodiments, a mixture of curable materials is used to form the building material and at least two of the curable materials are curable under the different curing conditions (e.g., in the presence of the different polymerization catalysts/activators and/or when exposed to a different curing energy).

In some of the any of the embodiments described herein the first composition comprises a first curable material and the second composition comprises a second curable material, which is chemically different from the first curable material.

The second curable material, according to some of these embodiments is curable under curing conditions which are different from the curing conditions under which the first curable material is curable.

In some embodiments, both the first and the second curable materials are monomers, which form a polymeric material via different polymerization reactions.

In some embodiments, the first material comprises a first plurality of monomers which are polymerizable by a first polymerization reaction and the second material comprises a second plurality of monomers which are chemically different from the first plurality of monomers and which are polymerizable by a second polymeric reaction which is different from the first polymerization reaction.

For example, the first polymerization reaction can be a free-radical polymerization, a cationic polymerization, or an anionic polymerization, and the second polymerization reaction can be a ring opening polymerization such as anionic ROP, or vice versa. Alternatively, the first polymerization reaction can be a free-radical polymerization, and the second polymerization reaction can be a cationic polymerization, or an anionic polymerization, or vice versa. Further alternatively, the first and polymerization reactions can be the same reactions, but the first polymerization reaction is a photoinduced polymerization and the second polymerization reaction is thermally-induced polymerization, or vice versa. Any other combination of different polymerization reactions is contemplated.

Exemplary compositions that are usable in these embodiments, while digitally controlling the properties of the obtained building material at the voxel level, include compositions similar to those disclosed in International Patent Application Publication No. WO 2013/128452.

Exemplary compositions that are usable in these embodiments, while digitally controlling the properties of the obtained building material at the voxel level, include a first composition that comprises a first curable material that is polymerizable by photo-induced polymerization, for example, cationic polymerization, such as a monomer usable for forming an epoxy resin, and a second curable material that is polymerizable by a ring opening polymerization, for example, a thermally-induced anion ROP, such as a lactam or lactone (e.g., caprolactone). Epoxy resins formed upon exposure to a suitable electromagnetic irradiation may chemical interact with polyester or polyamide materials forms upon exposure to a suitable thermal curing by cross-linking. The formed building material features properties that can be digitally controlled at the voxel level.

When contacted and exposed to a suitable curing energy, the first and second pluralities of monomers chemically react with one another to form a building material that comprises two polymerized materials which are chemically interacted with one another. The two polymerized materials, one formed of the first curable material and the other formed of the second polymerized material, can be chemically interacted by means of forming a co-polymer, as described herein, or, for example, by means of covalent cross-linking therebetween.

These embodiments are also described herein interchangeably as referring to a first composition which comprises a part of the base material and a second composition which comprises another part of the base material. One of the parts of the base material can also be regarded as a second material that chemical reacts with the part of the base material in the other composition, to form the building (e.g., modeling) material.

In these embodiments, the second material forms a part of the building (e.g., modeling) material upon chemically reacting with the base material.

In exemplary embodiments, the second material is a second curable material which is cross-linked by the first curable material, or by a polymer or an oligomer formed upon exposing the first material to a suitable curing energy. Such cross-linking modifies one or more of the chemical, physical and mechanical properties of the first and/or second materials.

When contacting such first and second curable materials, exposing to suitable curing energy or energies, and selecting a ratio of the first and second compositions, various properties of the obtained building material can be digitally controlled.

Non Co-Polymerizable Compositions:

In some of any of the embodiments described herein, the first curable material, as defined herein, forms the building (e.g., modeling) material by chemically reacting with a second material that is not a curable material, or is not a base material or a part thereof, namely, it does not constitute the repeating backbone units of the polymeric building (e.g., modeling) material.

In these embodiments, the curing of the first curable material occurs in the presence of a second material, which chemically reacts with the curable material when the materials are contacted and exposed to a curing energy, as defined herein, and forms a part of the building (e.g., modeling) material.

When the first curable material in a monomer that polymerizes when exposed to curing energy, the second material can react chemically with the first curable material before the polymerization, e.g., with a monomer, during the polymerization, e.g., with an intermediate oligomer, or with one or more polymeric chains of the polymeric material obtained by the curing.

In some embodiments, by chemically interacting with the first curable material, the second material forms a part of the building (e.g., modeling) material obtained upon exposing the first curable material to curing energy.

In some of these embodiments, the first composition comprises the first curable material, and another composition (e.g., the second composition) comprises the second material which chemically reacts with the first curable material to form the building (e.g., modeling) material.

In some of these embodiments, the first curable material comprises one material, e.g., one type of monomers or oligomers, or short-chain polymers, and a modeling material is formed by exposing the first material to curing energy, such that curing results in polymeric chains that are substantially comprised of repeating backbone units of the first curable material, covalently attached to one another, without being chemically interrupted or cross-linked by other backbone units, and without reacting with other materials (e.g., chemically different monomers) to form the backbone unit of the polymeric chains.

In some of any of the embodiments described herein, the first material is a curable material and the second material is a cross-linking agent that chemically reacts with the first curable material by cross-linking the polymeric material formed upon curing the first curable material.

Alternatively, the first curable material comprises a mixture of curable materials (e.g., mixture of chemically different monomers), as described herein. In some embodiments, the second material is such that promotes the curing of the first curable material. Such materials are referred to herein and in the as art as "promoters" or "activators".

Herein, by "promoting a curing" it is meant that the curing does not occur, or occurs slowly, in the absence of a promoter, yet occurs or is accelerated in the presence of a promoter.

Herein, a "promoter" or "activator" is to be distinguished from a catalyst or an initiator in that it reacts chemically, as defined herein, with a curable material, and hence forms a part of the final building material formed upon exposing the curable material to curing energy.

A promoter can be utilized in a chemical reaction at a ratio, relative to curable material, that is 1:1, yet, is preferably lower than 1:1, for example, 1:1.5, 1:2, 1:3, 1:4, 1:5, and so forth, and up to 1:100, including any intermediate value or subranges between 1:1 and 1:100. Preferably, the ratio ranges from 1:1 to 1:10, and can be, for example, 1:2, 2:3, 4:6, 1:5, etc.

While promoters are often used to accelerate a polymerization reaction, that is, to affect the reaction kinetics, some promoters are designed and/or selected to impart to the final polymeric material additional properties, or to modify properties of the polymeric material. As an example, a promoter can be a material that forms a block-copolymer when reacting with a monomer (or an oligomer, or a mixture of monomers and/or oligomers), upon exposure to curing energy. In another example, the promoter introduces to the formed polymeric material a moiety that imparts or modifies a property in the polymeric material as described herein. In another example, the promoter induces cross-linking of the formed polymeric material and thereby modifies a property in the polymeric material as described herein.

By selecting the ratio of the first and second compositions, and thus the ratio of the first curable material and the second material, which is a promoter, for each voxel block, the property or properties imparted or modified by the promoter is determined, and different polymeric materials (building materials), which exhibit a different degree of such property or properties, are obtained, for each voxel block.

In exemplary embodiments, the second material promotes a curing (e.g., polymerization) of a curable material, as described herein, and comprises a moiety such as, for example, an elastomeric chemical moiety, and optically-active chemical moiety, a light-absorbing chemical moiety, a hydrophobic chemical moiety, a hydrophilic chemical moiety and/or a reactive chemical moiety.

By chemically reacting with the curable material and forming a part of the building material upon exposure to curing energy, such a moiety is introduced to the polymeric material formed upon curing, and the respective property of the building material is modified.

Thermally-Curable Compositions:

In some embodiments of any of the embodiments described herein, any of the first and second materials described herein chemically react with one another upon being exposed to thermal curing, that is, upon being exposed to heat.

In some embodiments of any of the embodiments described herein, at least one of the first and second compositions comprises a thermally-curable material.

According to these embodiments, the building material is referred to as a thermally-cured building material.

A thermally-cured building material, according to embodiments of the present invention, is obtained by exposing a thermally-curable material to heat.

Thermally-curable materials are materials which harden or solidify upon exposure to heat. Such materials are typically monomers, oligomers or short-chain polymers, or a mixture thereof, which undergo a chemical reaction such as polymerization and/or cross-linking, upon exposure to heat, to produce a hardened or solidified material, typically a polymeric material.

In some embodiments, a thermally-curable material is a monomer, an oligomer, or a mixture of monomers and/or oligomers, which undergoes polymerization or co-polymerization or cross-linking, when exposed to heat, as described herein.

Such a reaction is referred to herein as "thermally-induced polymerization" or "thermal curing".

In these embodiments, the first and/or second material is a thermally-curable monomer or mixture of monomers and a building material formed therefrom is a thermally-cured polymer or co-polymer, respectively.

Exemplary thermally-induced polymerization reactions which require exposure to heat include, but are not limited to, ring-opening polymerization, anionic polymerization, and polycondensation.

Exemplary polymers that are typically obtained by thermal curing include, but are not limited to, polyamides, polyurethanes, and polyesters.

According to these embodiments, the thermally-curable material is selected suitable for undergoing any of the thermally-induced polymerization reactions described herein, and/or for forming any of the thermally-cured polymeric materials described herein.

In some embodiments, the thermally-curable material is a mixture of thermally-curable monomers, which upon exposure to heat co-polymerize via a thermally-induced polymerization reaction as described herein, to form a polymeric building material.

In some of these embodiments, the first and second compositions comprise a first and second thermally-curable materials, respectively, as described herein, which form a co-polymeric building material upon being contacted and exposed to heat.

In some embodiments, the thermally-induced polymerization reaction involves, in addition to a thermally-curable material, a second material which chemically reacts with the thermally-curable material during the thermally-induced curing, and upon being contacted with the thermally-curable material and exposure to heat, such that the second material forms a part of the building material formed upon thermally-induced polymerization, as described herein.

In some embodiments, the thermally-curable material and the second material react chemically with one another upon being contacted and exposed to heat.

In some embodiments, the second material is such that promotes a thermally-induced polymerization of the thermally-curable material, such as a promoter, as described herein.

In some of any of the embodiments described herein, the thermally-curable material polymerizes by a thermally-induced ring opening polymerization, such as an anionic ring opening polymerization.

In some of any of the embodiments described herein, the thermally-cured building material is a polyester, and the thermally-curable material is a precursor of the polyester.

Exemplary precursors of polyesters that polymerize by thermally-induced ring-opening polymerization are lactones, for example, a caprolactone.

In some of any of the embodiments described herein, the thermally-cured building material is a polyamide, and the thermally-curable material is a precursor of the polyamide.

Exemplary precursors of polyamides that polymerize by thermally-induced ring-opening polymerization are lactams.

An exemplary, commonly used lactam is a caprolactam, and more specifically $\varepsilon$-caprolactam.

Exemplary such thermally-curable monomers are lactams, which form upon thermally-induced polymerization polyamides such as Nylon6. Embodiments in which the thermally-cured building (e.g., modeling) material is a polyamide are discussed in the further detail hereinunder.

In some of these embodiments, the second material is a promoter of an anionic ring opening polymerization of caprolactam, which chemically reacts with the caprolactam upon exposure to heat. Such promoters are described in further detail hereinunder.

In some of any of the embodiments related to a method in which a thermally-cured building material is formed, the method further comprises exposing the dispensed layers to heat, as described herein.

When exposure to heat is effected by heat inducing radiation, it is preferable that at least some of the materials included in the first and/or second compositions and chemically reacting with one another are capable of absorbing the heat-inducing radiation.

In some embodiments, when one or more of these materials, e.g., the thermally-curable material and/or the second material, as described herein, do not absorb heat-inducing radiation, an IR dye or pigment are added to one or both of the first and second composition, as needed.

Polyamide-Containing Building Materials:

In some of any of the embodiments described herein, the building material is a polyamide-containing polymeric material, and the first curable material is a thermally-curable precursor of the polyamide.

By "polyamide-containing polymeric material" it is meant a polymeric material, at least a portion of which is a polyamide that is formed by polymerization of a precursor thereof. That is, the final polymeric material comprises at least one polymeric chain that is a polymerized precursor of a polyamide, as described herein.

Materials and compositions comprising such materials which are usable for forming polyamide-containing polymeric materials are also referred herein as "polyamide-forming materials".

Exemplary precursors of polyamides that polymerize by thermally-induced ring-opening polymerization are lactams, such as caprolactam, piperidone, pyrrolidone and laurolactam.

An exemplary, commonly used, lactam is a caprolactam, and more specifically s-caprolactam. Whenever "caprolactam" is mentioned herein, s-caprolactam is encompassed.

In some of any of the embodiments described herein for polyamide-forming materials, the lactam is caprolactam, laurolactam or a mixture thereof. In some embodiments, the lactam is caprolactam.

As discussed hereinabove polyamides of the Nylon6 type are formed by polymerization of caprolactam. Such a polymerization is a thermally-induced ring opening polymerization, which can undergo several pathways:

Self polycondensation (typically by heating at a temperature of 260° C. for a few hours); cationic polycondensation (typically in an acidic aqueous solution, by heating at a temperature of 250° C. for a few hours); and anionic polymerization (typically by heating at 130-160° C., for up to 30 minutes, and even for less than 1 minute).

An anionic ring opening polymerization of caprolactam is considered the most industrially applicable methodology for production Nylon6. This reaction takes place in the presence of a catalyst, typically a strong base or a product of a reaction of a strong base and caprolactam, as described hereinafter, and a promoter or activator, for example, an N-acylcaprolactam.

Scheme 1 below presents an exemplary synthetic pathway for polymerization of caprolactam via anionic ROP using an N-octylcaprolactam as an activator.

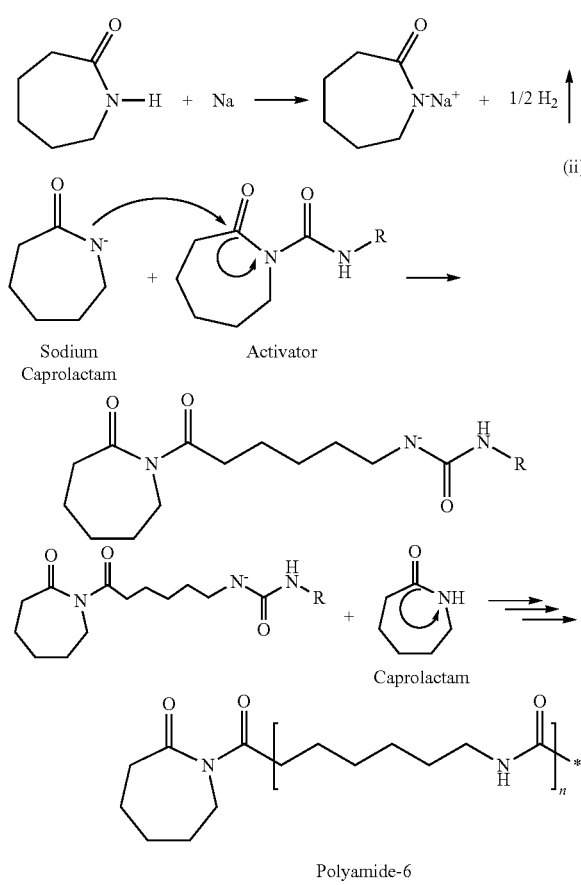

In step (i), initiation of the reaction is effected by reacting caprolactam with a strong base. This step can be performed in situ, such that the base (e.g., sodium) serves as catalyst, or that sodium caprolactam is added as the catalyst.

Commonly used catalysts include sodium caprolactam and caprolactam MgBr (magnesium bromide caprolactam).

In step (ii), the anionic caprolactam reacts with an N-acyl caprolactam (or any other activator) to form an intermediate anion, whereby the activator forms a part of this intermediate anion. The polymerization then proceeds by step-by-step linking amide units to the intermediate anion.

Commonly used activators include N-acetylcaprolactam and N,N'-isophthaloyl-bis-caprolactam, respectively:

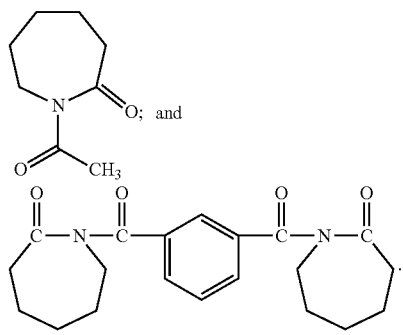

Other lactam activators include, lactams N-substituted by electrophilic (electron-withdrawing) moieties, aliphatic diisocyanates, aromatic diisocyanates, polyisocyanates, aliphatic diacyl halides and aromatic diacyl halides, and any combination thereof.

Lactams N-substituted by electrophilic moieties include for example acyllactams.

Aliphatic diisocyanates include compounds such as butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate.

Aromatic diisocyanates include compounds such as tolyl diisocyanate, and 4,4'-mnethylenebis(phenyl)isocyanate.

Polyisocyanates include, for example, isocyanurates of hexamethylene diisocyanate, allophanates (for example ethyl allophanate).

Aliphatic diacyl halides include, for example, compounds such as butylene diacyl chloride, butylene diacyl bromide, hexamethylene diacyl chloride, hexamethylene diacyl bromide, octamethylene diacyl chloride, octamethylene diacyl bromide, decamethylene diacyl chloride, decamethylene diacyl bromide, dodecamethylene diacyl chloride, dodecamethylene diacyl bromide, 4,4'-methylenebis(cyclohexyl acid chloride), 4,4'-methylenebis(cyclohexyl acid bromide), isophorone diacyl chloride, isophorone diacyl bromide.

Aromatic diacyl halides include, for example, compounds such as tolylmethylene diacyl chloride, tolylmethylene diacyl chloride, 4,4'-methylenebis(phenyl)acid chloride), 4,4'-methylenebis(phenyl)acid bromide.

Additional activators include, for example, acyl lactams, such as disclosed in EP Patent No. 1449865, oxazolines such as disclosed in EP Patent No. 0786482, ethylenebisamides such as disclosed in U.S. Patent Application Publication No. 2010/0113661, isocyanates, and masked (capped, e.g., caprolactam-blocked) isocyanate compounds, such as, for example, hexamethylene diisocyanate (HDI).

Other liquid activator systems for anionic lactam polymerization are known in which isocyanate compounds are mixed with pyrrolidone compounds, e.g. N-methyl pyrrolidone or N-ethyl pyrrolidone, as described, for example, in EP Patent No. 0167907. EP Patent Application Nos. 0134616 and 0135233 disclose N-substituted carbamoyl-lactam compounds suitable as promoters or activators for anionic polymerization of lactams.

In some embodiments, the activator is used either per se or in a solution. In some embodiments, the activator is dissolved in the lactam (e.g., caprolactam).

As seen in Scheme 1, the activator serves as a base unit to which amide moieties are added to form the final polymer, and hence forms a part of the final polymeric material.

The amount of the activator defines the number of growing chains, since every activator molecule represents the initial member of a polymer chain. The molar ratio of the lactam to the activator can be varied within wide limits can be in the range from 1:1 to 10 000:1, preferably in the range from 5:1 to 2000:1, and more preferably in the range from 20:1 to 1000:1.

In some embodiments, the ratio of the lactam and the activator can determine a property of the obtained polyamide material.

In exemplary embodiments of any of the embodiments described herein, the method is effected while utilizing a first composition which comprises a lactam (e.g., caprolactam) and a second composition which comprises a second material which chemically reacts with the lactam upon exposure to heat to form the building material by anionic ring opening polymerization.

In some of these embodiments, the second material is a promoter of a ring opening polymerization (ROP) (e.g., an anionic ring opening polymerization) of the lactam (an activator as described herein).

In some of these embodiments, the promoter is selected as capable of modifying a property of the building material, as described herein.

In some of these embodiments, a degree of the modifying is determined by selecting the ratio of the first and second compositions.

Thus, a method as described herein can be utilized for forming objects made by utilizing a polyamide-containing building (e.g., modeling) material, by selecting a promoter which forms a part of a polyamide formed from a lactam such as caprolactam, and modifies a property of this polyamide-containing polymer, whereby a chemical composition of the building material, and hence one or more properties thereof, are determined, at a voxel level, by selecting a ratio between a first composition which comprises the lactam and the second composition which comprises the promoter.

Many promoters for anionic ROP of caprolactam, which affect a property, and particularly a mechanical property, of the formed polymeric material are known in the art, and all such promoters are contemplated by embodiments of the present invention.

Non-limiting exemplary promoters, referred to also as "activators", which are usable in the context of these embodiments of the present invention are described, for example, in U.S. Pat. No. 3,304,291, which discloses activators consisting of organic nitrogen compounds having on at least 2 to 12 carbon hydrocarbon radical being an N-substituted compound of at least one urea, thiourea or guanidine radical; U.S. Pat. No. 3,770,689, which discloses polyether promoters in which the polymer chains are permanently terminated on at least one end by a promoter function, whereby the promoter functional groups or substituents are similar to monomeric promoters such as acid-chloride groups, isocyanates, N-carbonyl-lactam groups, imide groups, N-carbonyl-sulfonamide groups, N-carbonyl-urea groups and acid-anhydride groups; GB Patent No. 1,067,153 which discloses an isocyanate capped polypropylene glycol; in U.S. Pat. Nos. 3,862,262, 4,031,164, 4,034,015, and 4,223,112, which disclose additional polyol-polyacyl polymers used as promoters and forming Nylon block copolymers or terpolymers; U.S. Pat. No. 9,139,752 which discloses capped (lactam-blocked) isocyanate as an activator (promoter); U.S. Patent Application Publication No. 2012/0283406 which discloses an aliphatic or alicyclic di- or multi-isocyanate compound; and EP Patent Application No. 2801588 which discloses (optionally caprolactam-blocked) isocyanate compounds based on hexamethylene diisocyanate (HDI). Any of the activators described hereinabove are also contemplated.

In some of any of the embodiments described herein for a method in which the curable material is a lactam such as caprolactam, a second material is a promoter of caprolactam anionic ROP, which comprises one or more moieties that chemically interact with the lactam (e.g., caprolactam), and thus forms a part of the polyamide material formed upon curing the caprolactam.

In some of any of the embodiments described herein, the promoter further comprises an additional moiety which, when present in the obtained polymeric material, imparts or modifies a property of the polymeric (polyamide) material, as described herein. For example, the promoter can further comprise a moiety that imparts or modifies a property of the polyamide material compared to a Nylon6 polyamide made of caprolactam and an activator such as, for example, N-acetyl caprolactam.

In some embodiments, the second material is other than N-acetyl caprolactam. This commonly used activator, while accelerating the anionic polymerization reaction, does not include a moiety that affects a property of a formed polyamide-containing polymer.

Exemplary moieties that impart or modify a property of a polymeric material when present in a promoter according to these embodiments include, but are not limited to, impact modifying moieties, elastomeric moieties, optically-active moieties, light-absorbing moieties, conductive moieties, metal-chelating moieties, hydrophobic moieties, hydrophilic moieties and/or a chemically-reactive moieties, as these are defined herein.

Moieties capable of effecting cross-linking of polyamide chains are an example of moieties that affect properties of the formed polyamide, for example, impact resistance, elasticity, stiffness, and the like.

Multifunctional moieties to which polyamide chains are attached are also an example of moieties that affect properties of the formed polyamide, for example, impact resistance, elasticity, stiffness, and the like. Multifunctional activators, having two or preferably three or more groups that attach to the lactam are an example of materials that form such moieties.

An exemplary second material according to these embodiments can be generally represented by Formula I:

  Formula I wherein:

A is the additional moiety that imparts or modifies a property of the polyamide-containing polymer, as described herein; R is N-acyl lactam, which is attached to a polyamide chain formed of the lactam; and n is a positive integer.

In some of any of the embodiments described herein for a lactam such as caprolactam, the second material comprises at least two N-acyl lactam groups, such that in Formula I, for example, n is 2 or is greater than 2 (e.g., 3 or 4).

An N-acyl lactam group is described herein as:

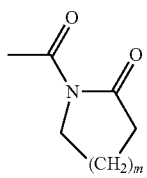

wherein m can be 1, 2, 3, 4, or 5. In N-acetyl caprolactam, m=3.

Exemplary promoters which are usable in the context of the caprolactam embodiments described herein as a second material can be collectively represented by Formula II:

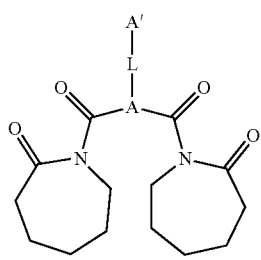

Formula II wherein A is the additional moiety that imparts or modifies a property of the polyamide-containing polymer; L is absent or is a linking moiety; and A' is absent or is another additional moiety, being the same or different from the moiety A.

In some embodiments, A is a hydrocarbon moiety, of e.g., 1-30 carbon atoms in length. The hydrocarbon moiety can be linear and/or cyclic, saturated or unsaturated, substituted or unsubstituted, and may be interrupted by one or more heteroatoms (e.g., O, N, or S). The hydrocarbon moiety can be composed of alkyl, alkenyl, alkynyl, cycloalkyl, aryl or any combination of these groups.

In a non-limiting example, A is an alkyl (alkylene chain) of 6 carbon atoms, terminating at both ends by amine groups, and the promoter is:

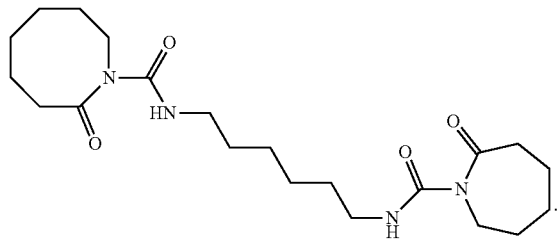 [SMILES: O=C1CCCCCCN1C(=O)NCCCCCCNC(=O)N1CCCCCC1=O]

In some embodiments, A comprises a hydrocarbon moiety, as described herein, interrupted by one or more polymeric moieties.

In some embodiments, L is absent and in some embodiments L is a linking moiety connecting A to A'. The linking moiety can be a hydrocarbon moiety, as described herein, a polymeric moiety, or can comprise both, as described herein for A.

In some of these embodiments, A is a branched moiety, connected to L via a branching unit.

A' is as described herein for A.

In some embodiments, A' comprises at least one N-acyl lactam moiety, connected directly to the linking moiety, or to an A moiety.

An exemplary such polymeric promoter is presented in the Examples section that follows. It is to be noted that other structures that comprise 1, 2 or more polymeric moieties that terminate with N-acyl lactam are usable as a second material as described herein.

In some embodiments, a polymeric moiety as described in any of these embodiments, is a poly(alkylene glycol) moiety (e.g., poly(ethylene glycol) or poly(propyleneglycol)), a polyacyl moiety, a poloxamer, and any combination thereof. Such polymeric moieties, when included in the polymeric material obtained upon curing, typically modify a mechanical property (e.g., as described herein) of the obtained polyamide-containing polymer (the building material).

Another exemplary second material according to these embodiments can be generally represented by Formula III:

A-(R)n        Formula III wherein:

A is the additional moiety that imparts or modifies a property of the polyamide-containing polymer, as described herein; R is an isocyanate group, which reacts with the lactam; and n is a positive integer.

In some of any of the embodiments described herein for a lactam such as caprolactam, the second material comprises at least two isocyanate groups, such that in Formula I, for example, n is 2 or is greater than 2 (e.g., 3 or 4).

In some embodiments, A is a hydrocarbon moiety, of e.g., 1-30 carbon atoms in length. The hydrocarbon moiety can be linear and/or cyclic, saturated or unsaturated, substituted or unsubstituted, and may be interrupted by one or more heteroatoms (e.g., O, N, or S). The hydrocarbon moiety can be composed of alkyl, alkenyl, alkynyl, cycloalkyl, aryl or any combination of these groups.

In a non-limiting example, A is an alkyl (alkylene chain) of 6 carbon atoms, terminating at both ends by isocyanate groups.

In a non-limiting example, A is an isocyanurate moiety, substituted by 1, 2 or 3 isocyanate-containing moieties, for example, an alkyl terminated by isocyanate.

In some embodiments, A comprises a hydrocarbon moiety, as described herein, interrupted by one or more polymeric moieties.

In some embodiments, A is or comprises a polymeric moiety.

In some embodiments, a polymeric moiety as described in any of these embodiments, is or comprises a poly(alkylene glycol) moiety (e.g., poly(ethylene glycol) or poly(propyleneglycol)), a polyacyl moiety, a poloxamer, a polyol, and any combination thereof. Such polymeric moieties, when included in the polymeric material obtained upon curing, may modify a mechanical property (e.g., as described herein) of the obtained polyamide-containing polymer (the building material).

Any of the isocyanate-containing activators described herein can be used per se or can be blocked, for example, caprolactam-blocked. Herein and in the art, the phrase "capped isocyanate" is also referred to interchangeably as "blocked isocyanate" and describes an isocyanate group which has been blocked by another functional group, e.g. a caprolactam group. This group typically acts as "protective group", blocking the isocyanate group during the reaction.

In some of any of the embodiments provided herein for caprolactam, the first composition further comprises a catalyst for inducing anionic polymerization of caprolactam. Any catalyst known in the art is usable in the context of these embodiments, including the exemplary catalysts sodium caprolactam and magnesium bromide caprolactam, which are also referred to herein and in the art as sodium caprolactamate and magnesium bromide caprolactamate, respectively.

Additional exemplary catalysts usable in polyamide forming compositions as described herein include, but are not limited to, alkali metal caprolactamates such as the above-mentioned sodium caprolactamate, as well as potassium caprolactamate; alkaline earth metal caprolactamates such as the above-mentioned bromide magnesium caprolactamate, chloride magnesium caprolactamate, and magnesium biscaprolactamate; alkali metal bases, for example sodium or sodium bases such as sodium hydride, sodium, sodium hydroxide, sodium methoxide, sodium ethoxide, sodium propoxide, sodium butoxide, for example potassium or potassium bases such as potassium hydride, potassium, potassium hydroxide, potassium methoxide, potassium ethoxide, potassium propoxide, potassium butoxide and mixtures thereof.

In some embodiments, the catalyst is sodium hydride, sodium, sodium caprolactamate and mixtures thereof.

The catalyst is preferably introduced into a caprolactam (or any other lactam) melt in which it can dissolve.

In some of any of the embodiments provided herein for caprolactam, the second composition is devoid of caprolactam.

In some of any of the embodiments provided herein for caprolactam, any of the embodiments described herein for chemical reaction between the first and second materials upon exposure to heat, and any combination thereof, are contemplated.

In some of any of the embodiments provided herein for caprolactam, any of the embodiments described herein for a second material being a promoter for modifying a property of a building material made of a curable material, and any combination thereof, are contemplated.

Additional Exemplary Compositions:

In some of any of the embodiments described herein, the curable material(s) are selected so as to form a polymeric material that comprises a polyester, a polycarbonate, a polyurethane, a polyether urethane, a polyether carbonate, a polyester carbonate, a polyester urethane, a polyanhydride, a polyamide, a polyacid, and copolymers thereof.

Curable materials that form such polymeric materials upon exposure to curing energy would be known to any person skilled in the art.

In some of any of the embodiments described herein, the curable materials are selected to form a polymeric (or co-polymeric) material upon exposure to heat.

In some of any of the embodiments described herein, the curable materials are selected to form a polymeric material upon exposure to heat, via an anionic polymerization.

In some of any of the embodiments described herein, the curable materials are selected to form a polymeric material upon exposure to heat, via a ring opening polymerization, e.g., an anionic ring opening polymerization.

In some of any of the embodiments described herein, the second material comprises a moiety (a component) that imparts or modifies a property of the polymeric material made of a curable material, as described herein.

In some embodiments, the property is a mechanical property and in some embodiments, it is the impact resistance.

Herein throughout and in the art, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and is expressed as J/m.

In these embodiments, the second material can be regarded as an impact modifying agent, and the ratio between the first and the second compositions determines an impact resistance property of the building material at a voxel block.

Moieties that may affect impact resistance (also referred to as impact modifying agents, or simply as impact modifiers) include, for example, elastomeric moieties, such as, but not limited to, a moiety derived from an elastomeric oligomer, polymer and/or co-polymer, and/or any other moiety that forms, for example, block polymers or co-polymers, within the polymeric network.

In some embodiments, the property is a physical property and in some embodiments, it is the heat deflection temperature.

Herein throughout and in the art, the phrase "heat deflection temperature", or HDT, describes the temperature at which a specimen of cured material deforms under a specified load. Determination of HDT can be performed using the procedure outlines in ASTM D648-06/D648-07.

As described herein, other moieties can be included in the second material for affecting a property of the building material, as described herein.

Optically-active moieties include, for example, moieties that may rotate the plane of linearly polarized light about the direction of motion as the light travels therethrough.

Light-absorbing moieties include, for example, chromophore moieties, including dye moieties, fluorescent moieties, phosphorescent moieties, and the light.

Conductance modifying moieties, referred to herein also as conductive moieties, include, for example, conjugated moieties that allow charge transfer therethrough.

Metal chelating moieties include moieties that can form organometallic complexes with various metals or metal ions.

Hydrophobic moieties include hydrocarbon moieties, as described herein, containing more than 4 carbon atoms, preferably more than 6 carbon atoms, and more preferably more than 8 carbon atoms.

Hydrophilic moieties include, for example, hydrocarbons, as described herein, substituted by one, and preferably more, e.g., 2, 3, 4, 5, 6, 7, 8, 10, and even more, hydrophilic moieties such as hydroxyl, carboxylic acid, amine, and the like. The inclusion of hydrophilic moieties may affect the swelling properties of the building material (e.g., a modeling material or a support material).

Chemically-reactive moieties include, for example, moieties or groups that readily react with another moiety or compound to form a bond, as described herein. Such moieties allow for attaching an additional material to selected portions of a printed object.

In embodiments pertaining to co-polymerizable materials, the second material may include a curable material which is a monomer similar to the first curable material, which is substituted by any one of the moieties described herein. By controlling the ratio of the first and the second compositions, the object features variable degrees of the property or properties imparted by these moieties at the voxel level, as described herein.

In embodiments pertaining to non co-polymerizable materials, one or the first and second composition may include materials that chemically interact with a curable material (the base material) so as to form a part of the building material, and these materials are or include any one of the moieties described herein. By controlling the ratio of the first and the second compositions, the object features variable degrees of the property or properties imparted by these moieties at the voxel level, as described herein.

In some of any of the embodiments described herein, the first and/or second compositions may comprise additional agents which may affect the formation of the building (e.g., modeling) material (e.g., affect the curing rate, the required curing energy and/or affect physical, chemical and/or mechanical property of the material).

Such agents include, but are not limited to, amine boosters, as described herein.

Exemplary amine boosters include polyalkyleneimines, for example, hyperbranched polyalkyleneimines or hyperbranched poethyleneimines.

Polyalkyleneimines, for example, polyethyleneimines can have an average molecular weight (weight average) in the range of from 100 to 3,000,000 grams/mol, or from 500 to 50,000 grams/mol, as determined, for example, via light scattering.

The polymers can have an amino functionality of primary and/or secondary amino groups in the range of from 10 to 70,000, for example, from 10 to 10,000 per chain, preferably in the range of from 20 to 500 per chain. Amino functionality can be determined from the distribution of the amino groups as is determinable from NMR measurements.

Polyalkyleneimines can be homopolymers or copolymers. The homopolymers are generally obtainable by polymerization of ethyleneimine (aziridine) in aqueous or organic solution in the presence of acid-detaching compounds, acids or Lewis acids. Homopolymers of this type are branched polymers generally comprising primary, secondary and tertiary amino groups in a ratio of about 30%:40%:30%. This distribution of amino groups is generally determinable via 13C NMR spectroscopy. The distribution is preferably in the range from 1:0.8:0.5 to 1:1.3:0.8.

Comonomers used are preferably compounds having at least two amino functions. Useful comonomers include for example alkylenediamines having 2 to 10 carbon atoms in the alkylene moiety, in which case ethylenediamine and propylenediamine are preferred. Useful comonomers further include triamines such as diethylenetriamine, triethylenetetramine, tetraethylenepentamine, dipropylenetriamine, tripropylene-tetramine, dihexamethylenetriamine, aminopropylethylenediamine and bisamino-propylethylenediamine.

Useful polyethyleneimines further include crosslinked polyethyleneimines, which are obtainable by reaction of polyethyleneimines with bi- or polyfunctional crosslinkers having at least one halohydrin, glycidyl, aziridine or isocyanate unit, or at least one halogen atom, as functional group. Examples of such crosslinkers are epichlorohydrin or bischlorohydrin ethers of polyalkylene glycols having 2 to 100 ethylene oxide and/or propylene oxide units.

Polyethyleneimines can further include amidated polymers typically obtainable by reaction of polyethyleneimines with carboxylic acids, carboxylic esters, carboxylic anhydrides, carboxamides or carbonyl halides; and/or alkoxylated polyethyleneimines obtainable for example by reaction of polyethyleneimines with ethylene oxide and/or propylene oxide; and/or hydroxyl-containing polyethyleneimines and amphoteric polyethyleneimines and/or lipophilic polyethyleneimines, generally obtained by incorporating long-chain hydrocarbon moieties in the polymer chain.

Suitable polyethyleneimines are available under the Lupasol® brand (from BASF SE, Ludwigshafen) for example.

Such agents can further affect a property of the building material as described herein. Inclusion of these agents in one of the first and second compositions and controlling the ratio of the compositions at the voxel level can therefore result in objects having different properties at different voxel blocks, as described herein.

Any of the first and second compositions as described herein can further comprise one or more agents which are chemically non-reactive with the curable materials forming the building (e.g., modeling) material.

Such agents include, for example, toughening agent, surface active agents, stabilizers, antioxidants, pigments, dyes, and/or dispersants.

A surface-active agent may be used to reduce the surface tension of the formulation to the value required for jetting or for printing process, which is typically around 30 dyne/cm.

Suitable stabilizers (stabilizing agents) include, for example, thermal stabilizers, which stabilize the formulation at high temperatures.

The pigment may be a white pigment. The pigment may be an organic pigment or an inorganic pigment, or a metal pigment or a combination thereof.

Combinations of white pigments and dyes are usable for preparing colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

Such agents can further affect a property of the building material as described herein. Inclusion of these agents in one of the first and second compositions and controlling the ratio of the compositions at the voxel level can therefore result in objects having different properties at different voxel blocks, as described herein.

In some of any of the embodiments described herein, one or more of the first and second compositions further comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added by incorporating in one or more of the compositions an elastomeric material in a dispersed/dissolved phase.

In some of any of the embodiments described herein, one or more of the first and second compositions further comprises an impact modifying agent.

Exemplary such agents include impact modifying agents usable in the formation of polyamine (e.g., Nylon6) materials, as described herein.

Other impact modifying agents, such as, for example, carbon fibers, carbon nanotubes, glass fibers, aramid Kevlar, polyparaphenylene benzobisoxazole Zylon, and other polar and non polar impact modifiers, are also contemplated.

Such agents can further affect a property of the building material as described herein. Inclusion of these agents in one of the first and second compositions and controlling the ratio of the compositions at the voxel level can therefore result in objects having different properties at different voxel blocks, as described herein.

The Printed Object:

According to an aspect of some embodiments of the present invention there is provided a printed object, obtained by a method as described herein in any of the respective embodiments and any combination thereof.

When the building material is a modeling material, as defined herein, the printed object is characterized by at least one portion in which one voxel block exhibits a certain property or sets of properties, and another voxel block exhibits a different property or sets of properties. In some embodiments, the different property is a different degree of the same property or set of properties, for example, different impact resistance, different HDT, different stiffness, different elasticity, different chemical reactivity, etc.

In exemplary embodiments, a printed object, or a portion thereof, comprises a polyamide material, as described herein, and in some embodiments, different voxels or voxel blocks of the polyamide material exhibits different properties, for example, different impact resistance, different elasticity, etc.

Figure 4:
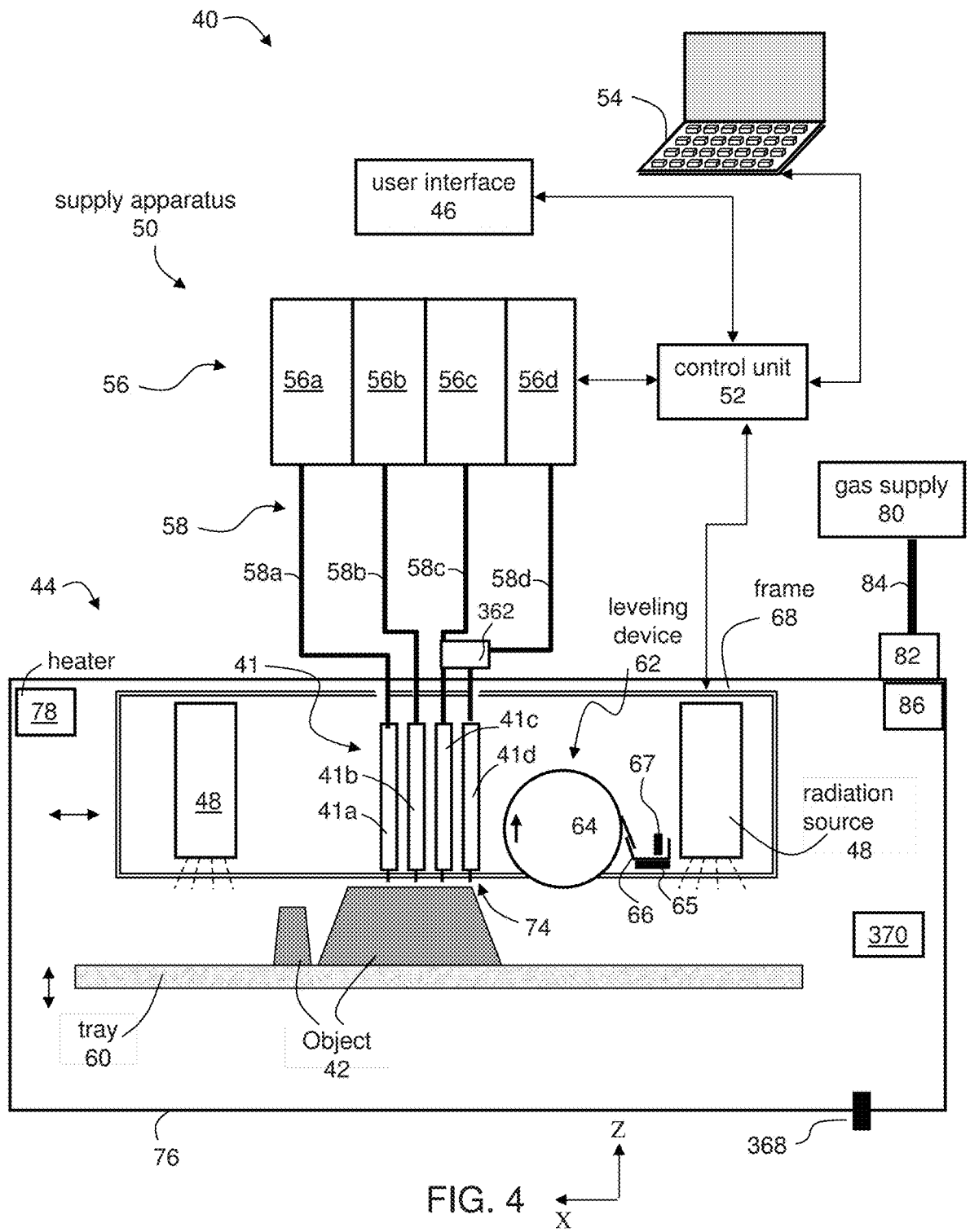
FIG. 4 is a schematic illustration of a three-dimensional printing system, according to some embodiments of the present invention.

The Systems:

FIG. 4 is a schematic illustration of a three-dimensional printing system 40, according to some embodiments of the present invention. System 40 comprises a three-dimensional printing apparatus 44 having a printing block 41 which comprises a plurality of printing heads. Printing block 41 is typically placed within an enclosure 76 forming a printing chamber therein. Each head preferably comprises an array of one or more nozzles (not shown), through which a composition is dispensed. The composition is generally shown at 74, but it is to be understood that more than one composition is employed as further detailed hereinabove. In various exemplary embodiments of the invention each head dispenses one of the compositions. If desired, two or more heads can dispense the same composition.

Each printing head is fed via a material reservoir which may optionally include a temperature control unit (e.g., a temperature sensor and/or a heating device), and a material level sensor. To dispense the composition, a voltage signal is applied to the printing heads to selectively deposit droplets of the respective composition via the printing head nozzles, for example, as in piezoelectric inkjet printing technology. The printing rate of each head depends on the number of nozzles, the type of nozzles and the applied voltage signal rate (frequency). Such printing heads are known to those skilled in the art of solid freeform fabrication.

In the example of FIG. 4, four printing heads 41a, 41b, 41c and 41d are illustrated. Each of heads 41a, 41b, 41c and 41d has a nozzle array. Heads 41a and 41b can be designated for the first and second compositions, as further detailed hereinabove, and heads 41c and 41d can be designated for a support material. Thus, head 41a can deposit the first composition, head 41b can deposit the second composition and heads 41c and 41d can both deposit a support material. Alternatively, heads 41c and 41d, can be combined in a single head having more nozzles than each of heads 41a and 41b. The heads and nozzles are preferably made of materials selected capable to withstand passage of heated compositions therethrough. In various exemplary embodiments of the invention the heads are configured for heating the materials contained therein.

Apparatus 44 can further comprise a curing system which can comprise one or more radiation sources 48, which can be, for example, an ultraviolet or visible or infrared or Xenon lamp, or other sources of electromagnetic radiation, or electron beam source, or ultrasound radiation source or microwave radiation source, depending on the materials being used. Radiation source 48 serves for curing or solidifying the materials, following their deposition. When the curing or solidifying is thermal, the components of the system may be exposed to elevated temperatures. Thus, the components of system 40 (particularly the printing heads, but also any other component) are preferably made of materials that sustain thermal curing temperatures. The present embodiments also contemplate configuration in which two different radiation sources apply different types of curing energies, as further detailed hereinabove.

The printing heads and radiation source or sources can be mounted in a frame or block 68 which is preferably operative to reciprocally move over a tray 60, which serves as the working surface. The radiation sources can be mounted in the block such that they follow in the wake of the printing heads to at least partially cure or solidify the materials just deposited by the printing heads. According to the common conventions, tray 60 is positioned in the X-Y plane. Tray 60 is typically configured to move vertically (along the Z direction), e.g., downward. Apparatus 44 can further comprise one or more leveling devices 62, e.g., a roller 64. Leveling device 62 serves to straighten, level and/or establish a thickness of the newly formed layer prior to the formation of the successive layer thereon. Leveling device 62 can comprise a waste collection device 66 for collecting the excess material generated during leveling. Waste collection device 66 may comprise any mechanism that delivers the material to a waste tank or waste cartridge. In various exemplary embodiments of the invention waste collection device 66 is constituted to handle reactive mixtures. This can be done in more than one way. In some embodiments, the compositions react within waste collection device 66 after they are removed from the deposited layer. In these embodiments, waste collection device 66 comprises a grinding device 67 that mechanically breaks the reaction product of the compositions into sufficiently small debris to allow them to be removed easily. Grinding device 67 can be in the form of a rotating blade, a shaker, an ultrasound source or the like. In some embodiments of the present invention waste collection device 66 is maintained at a reduced temperature such as to reduce the reaction rate, thereby allowing the compositions to be removed before the reaction is completed. This can be achieved, for example, using a heat pump 65 mounted on device 66.

System 40 preferably comprises a heater 76 that maintains an elevated temperature within the printing chamber enclosed by enclosure 76. The temperature within the enclosure is above the melting point of the dispensed compositions so as to maintain them in liquid form, thereby allowing them to be dispensed from the heads of block 41, yet sufficiently low so as to prevent the first and second composition from spontaneously reacting or curing before they are leveled by device 62 and to facilitate waste collection. For example when caprolactam is employed, heater 78 heats the printing chamber to a temperature of about 80° C. In some embodiments, leveling device 62 is heated, for example, by a heater (not shown) mounted on or integrally formed in device 62. These embodiments are particularly useful for compositions which tend to solidify or partially solidify immediately after they are dispensed. In these cases, a heated device 62 is advantageous since it liquefies or further liquefies the just deposited compositions thereby facilitating easier straightening and waste removal.

System 40 may also comprises a gas inlet 82 port, mounted on enclosure 76 and constituted to allow entry of gas, such as an inert gas or inert gas mixture as further detailed hereinabove, into the printing chamber. The gas can be provided to inlet 82 through a gas supply conduit 84 connected to a gas supply system 80, both of which can optionally and preferably also be part of system 40. In some embodiments, gas supply system 80 heats the gas prior to the delivery of the gas to inlet 82 port. Alternatively or additionally, a gas heater 86 can be placed in proximity to inlet port 82, so as to heat the gas upon entry into the printing chamber. Preferably the gas is heated to the same temperature that is maintained by heater 78.

Optionally, the printing chamber 76 is also formed with a gas outlet 368 for allowing the gas to exit the chamber if desired. Both inlet 82 and outlet 368 are of the present embodiments provided with valves (not shown) so as to controllably allow entry and/or exit of the gas to and from the chamber. Preferably, controller 52 generates, continuously or intermittently, inflow and outflow of the inert gas through the gas inlet and the gas outlet. This can be achieved by configuring controller 52 to control at least one of supply 80, inlet 82 and outlet 368. Optionally, system 40 comprises a gas flow generating device 370, placed within the chamber 76 and configured for generating a flow of the inert gas within the chamber. Device 370 can be a fan or a blower. Controller 52 can be configured for controlling also device 370, for example, based on a predetermined printing protocol.

In some embodiments of the present invention apparatus 44 comprises a mixing chamber 362 for preparing the modeling material formulation prior to entry of the modeling material formulation into a respective head. In the schematic illustration of FIG. 4, which is not to be considered as limiting, chamber 362 receives materials from different containers, mixes the received materials and introduces the mix to two heads (heads 41c and 41d, in the present example). However, this need not necessarily be the case since in some embodiments chamber 362 can receive materials from different containers, mixes the received materials and introduces the mix only to more than two heads of only to one head. Preferably, the position and fluid communication between mixing chamber 362 and respective head is selected such that at least 80% or at least 85% or at least 90% or at least 95% or at least 99% or the modeling material formulation that enters the respective head or heads (e.g., heads 41c and 41d in the present example) remains uncured. For example, chamber 362 can be attached directly to the printing head or the printing block, such that motion of the printing head is accompanied by motion of the mixing chamber. These embodiments are particularly useful when the formulation undergoes fast polymerization reaction even in the absence of curing radiation.

In operation, the printing heads of printing block 41 move in a scanning direction, which is referred to herein as the X direction, and selectively deposit material in a predetermined configuration in the course of their passage over tray 60. The material typically comprises two or more compositions as further detailed hereinabove and one or more types of support material. The passage of the printing heads of printing block 41 is followed by the curing of the deposited material(s) by radiation source 48. In the reverse passage of the heads, back to their starting point for the layer just deposited, an additional deposition of material(s) may be carried out, according to a predetermined configuration. In the forward and/or reverse passages of the printing heads, the layer thus formed may be straightened by leveling device 62, which can follow in the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 60 is lowered in the Z direction to a predetermined Z level, according to the desired thickness of the layer subsequently to be printed. The procedure is repeated to form three-dimensional object 42 in a layerwise manner.

Tray 60 can alternatively or additionally be displaced in the Z direction between forward and reverse passages of the printing head of printing block 41, within the layer. Such Z displacement may be carried out for example in order to cause contact of the leveling device with the surface in one direction and prevent contact in the other direction.

System 40 also comprises a material supply apparatus 50 which comprises the material containers or cartridges and supplies a plurality of materials to fabrication apparatus 44, via a respective plurality of supply ducts 58. In the illustration of FIG. 4, four supply containers 56a, 56b, 56c and 56d, and four supply ducts 58a, 58b, 58c and 58d are shown, for providing materials to heads 41a, 41b, 41c and 41d, respectively.

A controller 52 includes an electronic circuit that controls fabrication apparatus 44 and supply apparatus 50. The electronic circuit of controller 52 can communicate with a computer or data processor 54 which transmits digital data pertaining to fabrication instructions based on computer object data stored on a computer readable medium, preferably a non-transitory medium, in a form of a Standard Tessellation Language (STL) format or any other format such as, but not limited to, at the aforementioned formats. Typically, the circuit of controller 52 controls the voltage applied to each printing head or nozzle array and the temperature of the material in the respective printing head.

Once the manufacturing data is loaded to controller 52 it can operate without user intervention. Controller 52 may, however, receive additional input from the operator, e.g., using data processor 54 or using a user interface 46 communicating with unit 52. User interface 46 can be of any type known in the art, such as, but not limited to, a keyboard, a touch screen and the like. For example, controller 52 can receive, as additional input, one or more material types and/or attributes, such as, but not limited to, color, characteristic distortion and/or transition temperature, viscosity, electrical property, magnetic property. Other attributes and groups of attributes are also contemplated. Controller 52 can also receive a ratio between the first composition and the second composition, as further detailed hereinabove. The ratio can be received via user interface 46 or data processor 54. Data processor can also calculated the ratio based on the desired properties of object 42 and then transmit the ratio to controller 52.

In some embodiments of the present invention radiation source(s) 48 are also controlled by controller 52. For example, controller 52 can activate and deactivate radiation source(s) 48 according to a predetermined printing protocol. When system 40 comprises two different radiation sources that apply different types of curing energies, controller 52 preferably controls each of these radiation sources separately. For example, controller 52 can signal a first radiation source to deliver a first type of curing energy (e.g., in the form of UV radiation), and a second radiation source to deliver a second type of curing energy (e.g., thermal energy), such that the two types of curing energies are delivered according to a predetermined curing scenario sequentially, simultaneously or intermittently. In any of these curing scenarios, controller 52 can also signal the radiation source (s) to deliver the energy repeatedly.

System 40 can fabricate an object by depositing different materials from different printing heads. In various exemplary embodiments of the invention the electronic circuit of controller 52 is configured to form voxel blocks, wherein, for each block, a ratio between a number of voxels of the first composition in the block and a number of voxels of the second composition in the block corresponds to the selected ratio received from data processor 54 or user interface 46.

The system of present embodiments provides the ability to select materials from a given number of materials and define desired combinations of the selected materials and their properties. The spatial locations of the deposition of each material with the layer are defined, either to effect occupation of different three-dimensional spatial locations by different materials, or to effect occupation of substantially the same three-dimensional location or adjacent three-dimensional locations by two or more different materials so as to allow post-deposition spatial combination of the materials within the layer.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Polyamide-Forming Materials

Materials

A caprolactam monomer and a catalyst for anionic ring opening polymerization (ROP), were obtained from Bruggerman, in accordance with a monomer and a catalyst used for preparing NYRIM® products.

The monomer and catalysts were mixed to form composition A (an exemplary first composition according to some embodiments of the present invention).

A caprolactam activator used for preparing NYRIM® products, was also obtained from Bruggerman. The caprolactam activator is 1,3-Benzenedicarbonyl dichloride, polymer with 2-methyloxirane polymer with oxirane ether with 1,2,3-propanetriol (3:1), caprolactam-terminated; otherwise referred to as Polyoxypropylene-polyoxyethylene-block copolymer isophthalic acid biscaprolactam ester; CAS No. 718612-97-6; $C_{20}H_{24}N_2O_4 \cdot [C_3H_8O_3 \cdot 3(C_3H_6O \cdot C_2H_4O)_x]$, the chemical structure of which is shown below:

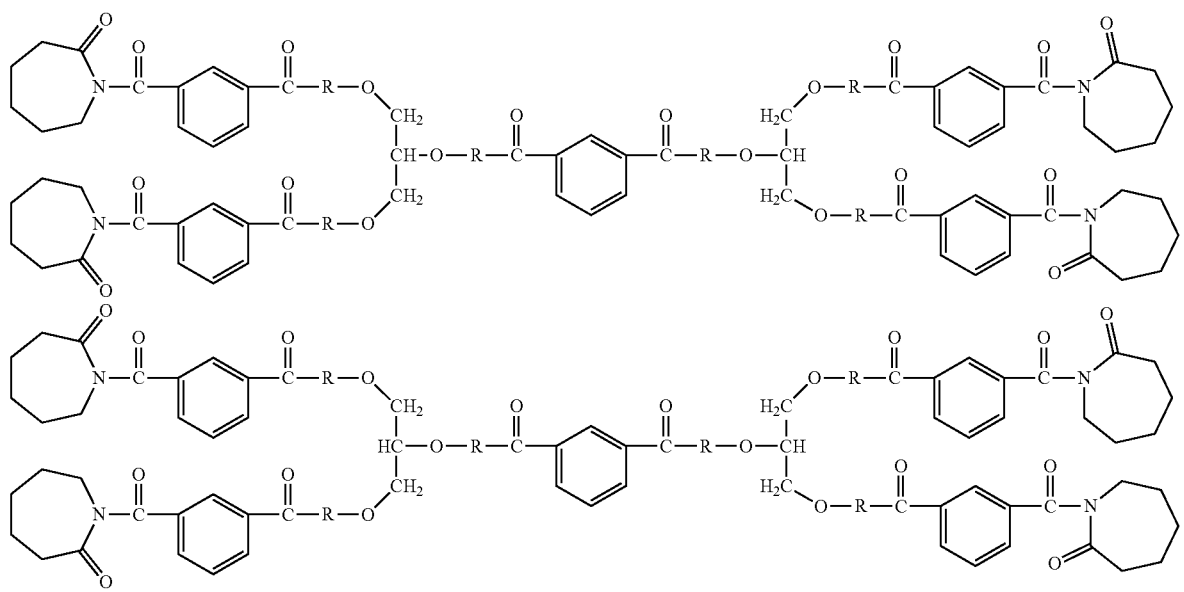

wherein R is:

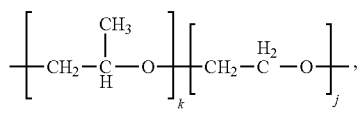

wherein k is approx. 23 and j is approx. 5.

The polymer has Mn of 10,485 Da; and Mw of 27,143 Da.

The caprolactam activator forms an exemplary Composition B according to some embodiments of the present invention.

Methods

Composition A was jetted by inkjet head A or a set of inkjet heads A and Composition B by inkjet head B or a set of inkjet head B.

The inkjet temperature was between 80-110° C., to make sure the caprolactam is liquid and the activator viscosity is suitable.

The compositions were jetted on a heated tray, simultaneously, and were subsequently heated by an IR or Halogen lamp, at a temperature above 110° C., so as to effect a polymerization.

The ratio between the jetted materials was digitally predetermined, controlling the amount (weight) jetted from every head. Optionally, drop sizes can be controlled to achieve a selected weight between compositions A and B, while considering viscosity and/or density of the compositions.

Results: Table 2 below presents the obtained data.

TABLE 2

| Jet A | Jet B | ratio | Level of chemical control | Properties |
|---|---|---|---|---|
| Caprolactam + catalyst | Activator | 5:1 | 6 voxels | Similar to Nyrim ® 2000* |

TABLE 2-continued

| Jet A | Jet B | ratio | Level of chemical control | Properties |
|---|---|---|---|---|
| Caprolactam + catalyst | Activator | 7:3 | 10 voxels | Similar to Nyrim ® 3000 |
| Caprolactam + catalyst | Activator | 6:4 | 5 voxels | Similar to Nyrim ® 4000* |

*See, Table 1

Example 2

Polyamide Forming Materials

Materials

Table 3 below presents materials usable for forming polyamide materials while using a method as described herein.

TABLE 3

| Compound | Function | Trade name/Chemical Composition | Source |
|---|---|---|---|
| ε-CL | Curable monomer | AP-NYLON ® Caprolactam | Brüggemann KG |
| ε-CLE | Curable monomer/ Impact modifier | ε-caprolactone; Capa ™ Monomer | Perstorp |
| C10 | Curable Monomer + catalyst | BRUGGOLEN ® C10 (about 17-18% of NaCL in ε-CL) | Brüggemann KG |
| C20 | Curable Monomer + activator | Bruggolen ® C20P (about 80% of ε-CL blocked HDI in ε-CL) | Brüggemann KG |
| BruggolenTP C-1312 | Activator | Bruggolen TP C-1312 (PPG/PEG based high molecular weight ε-CL blocked isocyanate macroactivator) | Brüggemann KG |

TABLE 3-continued

| Compound | Function | Trade name/Chemical Composition | Source |
|---|---|---|---|
| LL | Curable monomer | Laurolactam (12-Aminododecanolactam, 98%) | Sigma-Aldrich |
| PDL | Curable monomer | ω-Pentadecalactone, ≥98% | Sigma-Aldrich |
| PEI FG | Impact modifier/ amine booster | Lupasol ® FG (polyethyleneimine, about 800 g/mol, 99%) | BASF |
| PEI PR8515 | Impact modifier/ amine booster | Lupasol ® PR8515 (polyethyleneimine, about 2000 g/mol, 99%) | BASF |
| PEI WF | Impact modifier/ amine booster | Lupasol ® WF (polyethyleneimine, about 25000 g/mol, 99%) | BASF |
| N3900 | Activator | Desmodur N 3900 (asymmetric isocyanurate trimer of hexamethylene diisocyanate) | Bayer |
| BL-N3900 | activator | ε-Caprolactam blocked Desmodur N 3900 | Synthetically prepared by the present inventors* |
| IDA | Impact modifier/ amine booster | Baxxodur ® EC 201 (Isophorone diamine) | BASF |
| T-403 | Impact modifier/ amine booster | Baxxodur ® EC 310 (Trifunctional polyether amine, $M_w$ about 440 g/mol) | BASF |
| C540 | Impact modifier/ amine booster | Bruggolen ® C540 (Trifunctional polyether amine, $M_w$ about 5000 g/mol) | Brüggemann KG |

*see below general synthesis procedure

Preparation of ε-Caprolactam Blocked Desmodur N3900 (BL-N3900)

The subject modified activator is generally prepared as follows:

50 grams of AP-NYLON® Caprolactam (Bruggemann Chemie) and 50 grams of Desmodur N 3900 (Bayer AG) are added into a glass bottle containing a magnetic stirrer. The bottle is tightly sealed and the mixture is subjected to vigorous magnetic stirring and heated to 85-95° C. for 6 hours. Completion of the block reaction can be determined by viscosity measurements, wherein no further change in viscosity is indicative of reaction completion.

The reaction product is a highly viscous liquid, which does not crystallize at room temperature.

Methods

All experiments are performed using two-part model formulation systems, comprising a set of polyamide-forming materials divided into two formulations. Generally, the Model A formulation in the formulation system (the first composition) comprises at least one caprolactam monomer, and a catalyst, and may further comprise one or more impact modifier(s) and/or amine boosters, and/or one or more additional thermally-curable monomers (e.g., a laurolactam or a caprolactone). Model B formulation (the second composition) in the formulation system comprises an activator and may further comprise one or more impact modifier(s) and/or amine booster(s), and/or one or more additional thermally-curable monomers (e.g., a caprolactone).

Herein, the term "amine booster" refers to an amine-containing compound which increases the polymerization rate, as described herein, presumably by activating the activator. Some amine boosters are also known and referred to in the art as Impact modifiers.

Molds: Mold experiments are conducted by mixing Model A formulation (the first composition) and Model B formulation (the second composition) at the indicated weight ratio in, for example, a mold having a thickness of 3.2 mm, a length of 127 mm, and a width of 12.7 mm. The total weight ratio of Model A and Model B formulations is about 100 grams. Mold experiments are indicative of an effect of different ratios of the first and second compositions (formulations), and are used to predict as effect of a selected ratio of the compositions on a property of the building (e.g., modeling) material.

3D Inkjet printing: Three-dimensional inkjet printing of polyamide-producing formulations is performed using Connex® 500 system by dual jetting: Model formulation A (Model A; the first composition) was jetted by inkjet head A (or a series of inkjet heads A) and Model formulation B (Model B; the second composition) was jetted by inkjet head B (or a series of inkjet heads B).

The inkjet temperature is 65-110° C., typically 70-90° C. Jetting at this temperature range is suitable for having the caprolactam-containing and/or activator-containing formulations being in a liquid form and featuring the required viscosity.

The materials are jetted on a heated tray, simultaneously, and are subsequently heated by an IR or Halogen lamp or ceramic lamp, at a temperature above 110° C. (e.g., above 400° C.), so as to effect a polymerization.

Mechanical Properties:

HDT is measured using HDT 3 VICAT (CEAST, Italy).

Izod Impact is measured by RESIL 5.5J (CEAST, Italy).

DMA measurements indicate the temperature at which storage modulus decreases by 50%. This value is indicative of the stiffness degree of the material. Decrease of storage modulus at a high temperature indicates a stiff material and at a low temperature it indicates weak material.

DMA measurements are performed using DMA Q800 measurement device (TA Instruments (Belgium))

Exemplary Formulations:

Table 4A below presents exemplary Model A formulations (the first composition) and Table 4B below presents exemplary Model B formulations (the second composition).

TABLE 4A

| Component | (Model A) | | | | | | | | | | |
|---|---|---|---|---|---|---|---|---|---|---|---|
|  | (a) | (b) | (c) | (d) | (e) | (f) | (g) | (h) | (i) | (j) | (k) |
| C10 | 7.5 | 50 | 50 | 50 | 50 | 50 | 50 | 50 | 25 | 25 | 25 |
| ε-CL | 92.5 | 50 | 45 | 45 | 45 | 45 | 45 | 45 | 72.5 | 72.5 | 62.5 |
| LL |  |  |  |  |  |  |  |  |  |  | 10 |
| IDA |  |  | 5 |  |  |  |  |  |  |  |  |
| T-403 |  |  |  | 5 |  |  |  |  |  |  |  |
| C540 |  |  |  |  | 5 |  |  |  |  |  |  |
| PEI FG |  |  |  |  |  | 5 |  |  | 2.5 | 2.5 | 2.5 |
| PEI PR 8515 |  |  |  |  |  |  | 5 |  |  |  |  |
| PEI WF |  |  |  |  |  |  |  | 5 |  |  |  |

TABLE 4B (Model B)

| Component | (a) | (b) | (c) | (d) | (e) | (f) | (g) | (h) | (i) | (j) | (k) |
|---|---|---|---|---|---|---|---|---|---|---|---|
| C20 | | 5.2 | 34.7 | 34.7 | 34.7 | 34.7 | 34.7 | 34.7 | 34.7 | | |
| ε-CL | 92.5 | 65.3 | 65.3 | 65.3 | 65.3 | 65.3 | 65.3 | 65.3 | 30 | 30 | 30 |
| ε-CLE | | | | | | | | | 50 | | 50 |
| PDL | | | | | | | | | | 50 | |
| BL-N3900 | | | | | | | | | 20 | 20 | 20 |

The ratio between the jetted materials is digitally predetermined, controlling the amount (weight) jetted from every head. Optionally, drop sizes can be controlled to achieve a selected weight ratio between compositions A and B, while considering viscosity and/or density of the compositions.

Table 5 below presents an additional set of exemplary compositions, in which Model A formulations (the first compositions) containing caprolactam, catalyst, and optionally one or more amine compound(s) which increase the polymerization rate (amine booster(s)), and Model B formulations (the second compositions) containing non-blocked polyisocyanate-based activator and optionally caprolactone, were tested at various weight ratios. Table 5 below further presents the mechanical properties of the cured modeling materials obtained in the experiments conducted with formulations I-VI in molds, showing the effect of the weight ratio of Model A and Model B formulations (exemplary first and second compositions, respectively) of the mechanical properties of the obtained modeling material.

TABLE 5

| | Model A | | | | | Model B | | A/B weight ratio | HDT, °C (0.45 MPa) | Izod Notched (J/m) |
|---|---|---|---|---|---|---|---|---|---|---|
| No. | C10 | ε-CL | IDA | T-403 | C540 | N3900 | ε-CLE | | | |
| I | 31 | 69 | | | | 100 | | 80/20 | 155 | 60 |
| II | 31 | 64 | 5 | | | 100 | | 80/20 | 153 | 65 |
| III | 31 | 64 | | 5 | | 100 | | 80/20 | 155 | 60 |
| IV | 31 | 64 | | | 5 | 100 | | 80/20 | 155 | 140 |
| V | 31 | 64 | | 5 | | 45 | 55 | 70/30 | 155 | 54 |
| VI | 31 | 59 | | 5 | 5 | 27.5 | 72.5 | 60/40 | 75.8 | 850 |

In an additional set of experiments, the effect of various A:B ratios of selected first and second compositions on the mechanical properties of the obtained cured polyamide material was tested. The obtained data is presented in Tables 6A-6C.

TABLE 6A (A/B = 50:50 wt. %)

| Jet A | | | Jet B | | | | Izod, | |
|---|---|---|---|---|---|---|---|---|
| C10 | ε-CL | PEI FG | BL-N3900 | ε-CL | ε-CLE | HDT | notched | DMA |
| 25% | 72.5% | 2.5% | 20% | 30% | 50% | 153° C. | 210 J/m | 59° C. |

TABLE 6B (A/B = 70:30 wt. %)

| Jet A | | | Jet B | | | | Izod, | | DMA (Tan |
|---|---|---|---|---|---|---|---|---|---|
| C10 | ε-CL | PEI FG | BL-N3900 | ε-CL | ε-CLE | HDT | notched | DMA* | Delta, Tg) |
| 25% | 72.5% | 2.5% | 20% | 30% | 50% | 155° C. | 25 J/m | 74° C. | 80° C. |

TABLE 6C (A/B = 40:60 wt. %)

| Jet A | | | Jet B | | | | Izod, |
|---|---|---|---|---|---|---|---|
| C10 | ε-CL | PEI FG | BL-N3900 | ε-CL | ε-CLE | HDT | notched |
| 25% | 72.5% | 2.5% | 20% | 30% | 50% | 48.7° C. | 390 J/m |

The obtain data demonstrate that HDT, Impact resistance and stiffness of the cured material can be controlled by selecting the A:B weight ratio. At higher amount of part B, a cured material with high Impact is achieved. At higher amount of part A, a cured material with higher stiffness is achieved.

The compositions presented in Tables 4A, 4B, 5 and 6A-6C are to be regarded as representative, non-limiting, examples. The weight percents of each component in the compositions are not to be regarded as limiting and can be manipulated as desired.

Alternatively, or in addition, the indicated components can be replaced by other components featuring the same function, and are not to be regarded as limiting in any way. Further alternatively, or in addition, the weight ratio between the compositions can be manipulated as desired.

By digitally controlling the A:B ratio modeling materials featuring variable properties at the voxel block level can be obtained.

Example 3

Exemplary Process

Post-Process Treatment:

The present inventors have uncovered that following a 3D inkjet printing process of polyamide-forming compositions, the obtained cured material is not fully polymerized, and typically exhibits a relatively low HDT of about 40-50° C.

In order to achieve higher HDT values, thermal post process is required in order to complete the polymerization and obtain cured material featuring HDT of 150° C.

For example, the present inventors have successfully practiced a thermal post-process curing for 1 hour at 150° C.

In order to monitor polymerization completion, weight loss upon the post-process thermal treatment was measured. Weight of the cured material was measured prior to and following thermal post process.

A minimum weight loss during post-process (e.g., of about 1.5-2.5% by weight), is indicative of a successful printing and of obtaining a printed object with mechanical properties identical to those polymerized in molds.

Printing Data Selection:

In exemplary embodiments of the 3D inkjet printing processes described herein, Model A and Model B formulations (a first and a second composition, respectively) are jetted at various weight ratios, which can be realized as described herein Such a process can be performed in more than one way.

In some embodiments of the present invention a "Drop on Drop" printing protocol is employed, as described herein.

In some embodiments of the present invention a "side by side" printing protocol is employed, as described herein.

The weight loss of the cured object obtained upon 3D inkjet printing of formulation (c) in Tables 4A and 4B, using the "Drop on Drop" pattern and the "side by side" pattern was measured.

The obtained data suggested that selecting a Drop-on-Drop printing mode in which combining the two formulations occurs within each pixel, layer by layer, and distribution of the two composition within each layer is homogeneous/isotropic, is superior to the "side by side" printing protocol.

Thus, when printing data is selected such that different ratios of the first and second compositions are selected at each voxel level, as described herein, a printed object with controllable mechanical properties at the voxel level is provided.

Example 4

Exemplary System

The compositions of the present embodiments can be deposited, for example, using a system marketed as Objet Connex™ (Stratasys Ltd., Israel). Thermal curing conditions can be achieved, for example, using a ceramic lamp providing temperature of from about 400° C. to about 900° C., and wavelength of from about 2.4 µm to about 4.3 µm. Additionally or alternatively, the printing tray 60 can be heated to a temperature of from about 50° C. to about 180° C., and the printing chamber can be heated to a temperature of from about 50° C. to about 90° C.

In some embodiments of the present invention the printing system is sealed and is optionally and preferably equipped with one or more filters. These embodiments are useful for keeping the printing environment generally dry and inert. These embodiments are also useful for reducing or preventing entry of moisture into the system. Moisture can also be reduced alternatively or additionally using by means of a gas, such as an inert gas or inert gas mixture, that fills the chamber as further detailed hereinabove. Use of a drying filter is also contemplated. For example, the gas forming the printing environment within the printing chamber can be circulated through the drying filter.

In some embodiments of the present invention the printing block is thermally isolated from the printing chamber. These embodiments are particularly useful when it is desired to employ jetting at different temperatures.

Example 5

Co-Polymerizable Compositions Containing an Epoxy Curable Material and a Caprolactone Curable Material

Materials and Methods

A cycloaliphatic epoxy, 3,4-Epoxycyclohexyl-methyl-3,4-epoxycyclohexane carboxylate (UVACURE® 1500 by CYTEC) was used as a curable monomer which is polymerizable via cationic polymerization, in the presence of an initiator. Commonly used initiators are photoinitiators. The UV-activated photoinitiator Uvacure® 6976 was used. ε-Caprolactone (CAPA) was used as a thermally-curable monomer, which can be polymerized in the presence of the same photoinitiator.

Composition A is the epoxy+photoinitiator, and composition B is Caprolactone.

ε-Caprolactone (CAPA) and the photoinitiator were mixed to form the first composition, composition A, and the epoxy curable material and the photoinitiator were mixed to form the second composition, composition B.

Composition A was jetted by inkjet head A or a set of inkjet heads A and Composition B by inkjet head B or a set of inkjet head B.

The inkjet heads temperature was between 50 and 80° C.

The compositions were jetted on a heated tray, simultaneously, and were subsequently exposed to UV irradiation, for 30 minutes, and then to thermal curing, as described herein, for 12 hours, at 85° C.

The ratio between the jetted materials was digitally predetermined, controlling the amount (weight) jetted from every head. Optionally, drop sizes can be controlled to achieve a selected weight between compositions A and B, while considering viscosity and/or density of the compositions.

Alternatively, for assessing the effect of the A:B compositions ratio, compositions A and B were mixed in a mold and the mechanical properties of the obtained polymeric films were measured.

The data obtained for films obtained by 3D inkjet printing of various composition ratios is presented in Table 7 below.

TABLE 7

| CAPA | EPOXY | Max Stress (MPa) | Max Strain (%) | Feel |
|---|---|---|---|---|
| 100 | 0 | | | wax |
| 95 | 5 | 10.2 | 115 | thermoplastic |
| 90 | 10 | 0.33 | 50 | rubber |
| 67 | 33 | 1.7 | 29 | rubber |
| 50 | 50 | 20 | 12 | hard |
| 0 | 100 | 10 | 1 | hard |

These data suggest that the epoxy resin reacts as a cross-linker of the polycaprolactone, whereby the latter acts as an Impact modifier of the epoxy resin. These data indicate that the properties of objects made by dual jetting these two polymeric systems can be finely controlled at the voxel level, using the methods described herein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of fabricating an object, the method comprising:
    receiving three-dimensional printing data corresponding to the shape of the object;
    selecting a ratio between a first composition and a second composition, wherein said first composition comprises a first material and said second composition comprises a second material, said first and second materials undergoing a chemical reaction with one another so as to form a building material when exposed to a curing energy;
    dispensing droplets of said first and said second compositions in layers, on a receiving medium, using at least two different inkjet printing heads, according to said printing data;
    wherein for at least one region of the object, said dispensing of said droplets is selected to form voxel blocks, wherein, for each block, a ratio between a number of voxels of said first composition in said block and a number of voxels of said second composition in said block corresponds to said selected ratio;
    and wherein said first material is a first curable material and is a monomer polymerizable by an anionic ring opening polymerization, and wherein said second material is a second curable material which is a monomer polymerizable by photo-induced cationic polymerization and chemically reacts with said first curable material to form a co-polymer which forms a part of said building material, wherein a polymerized material formed of the first curable material and a polymerized material formed of the second curable material chemically interact with one another by cross-linking,
    wherein the method further comprises exposing the dispensed layers to said curing energy, said curing energy comprising thermal energy and UV irradiation.

2. The method of claim 1, wherein exposing the dispensed layers to said thermal energy comprises heating said receiving medium or a chamber hosting the receiving medium and/or by heat-inducing radiation.

3. The method of claim 1, wherein at least one of said first and second compositions comprises an additional material for inducing a chemical reaction between said first and second materials.

4. The method of claim 1, wherein said second material is capable of modifying a chemical, physical and/or mechanical property of a modeling material formed of said first curable material, upon chemically reacting with said first curable material and exposure to said curing energy to thereby form said co-polymer, and wherein a degree of said modifying is determined by selecting said ratio.

5. The method of claim 1, wherein said first curable material is a lactam.

6. The method of claim 5, wherein said first curable material is a caprolactam.

7. The method of claim 1, wherein said first curable material is a lactone.

8. The method of claim 7, wherein said lactone is a caprolactone.

9. The method of claim 1, wherein said first curable material is a lactam and/or a lactone and said second curable material is polymerizable by photo-induced cationic polymerization.

10. The method of claim 1, wherein said second curable material is an epoxy resin.

11. The method of claim 10, wherein said second curable material is a cycloaliphatic epoxy resin.

12. The method of claim 1, wherein at least one of said first and second compositions further comprises a photoinitiator.

13. The method of claim 1, wherein at least one of said first and second compositions further comprises a catalyst for inducing said anionic ring opening polymerization.

* * * * *